United States Patent [19]

Niwa et al.

[11] Patent Number: 5,488,207
[45] Date of Patent: Jan. 30, 1996

[54] KEY SWITCH WITH A LOCKING ARRANGEMENT ON A ROTATING ELEMENT

[76] Inventors: Takashi Niwa, 403, Shatouumeda, 6-1, Minamigebanochyou Sagahirosawa, Ukyoku, Kyoto Si; Kenji Shinohara, 201, Newshatou Nagaoka No. 2, 2 Chyoume, Kugai, Nagaokakyoshi, Kyoto Fu; Makito Morii, Takatsuki Dobashi Ryo 3-10, Dobashi Chyou Takatsukishi, Osada Fu, all of Japan

[21] Appl. No.: 11,628

[22] Filed: Feb. 1, 1993

[30] Foreign Application Priority Data

Jan. 31, 1992 [JP] Japan ................................. 4-016127
Apr. 10, 1992 [JP] Japan ................................. 4-090744

[51] Int. Cl.[6] .................................................. H01H 27/00
[52] U.S. Cl. ................................. 200/43.04; 200/43.07
[58] Field of Search ............................... 200/43.04, 43.07

[56] References Cited

U.S. PATENT DOCUMENTS 4,904,829  2/1990  Berthaud et al. ............... 200/43.04 X

FOREIGN PATENT DOCUMENTS

| 779536 | 4/1935 | France ............................. 200/43.07 |
| 2655182 | 5/1991 | France . |
| 9002917 | 6/1990 | Germany . |
| 2173043 | 10/1986 | United Kingdom ............... 200/43.07 |
| 9008396 | 7/1990 | WIPO . |

Primary Examiner—Renee S. Luebke

[57] ABSTRACT

A key switch which could, for example, be used to switch a power supply for a machine tool on and off, has a locking mechanism on a rotating element of a key disengages the locking mechanism on the rotating element. The key also engages the guide on the rotating element, thereby initiating the rotation of that element and activating the switching element. If an object other than the key is inserted, the lock on the rotating element will not be released, and the rotating element will be prevented from moving, so that the switching element cannot be activated. Furthermore in another embodiment, a machine stop detection signal is fed to an internal solenoid which prevents removal of the key until the machine stops completely.

6 Claims, 30 Drawing Sheets

KEY SWITCH WITH A LOCKING ARRANGEMENT ON A ROTATING ELEMENT

BACKGROUND

This invention concerns a key switch which could, for example, be used to switch a power supply for a machine tool on and off. In general, a key switch is generally defined here as an electrical switch device which has a key to allow the access to the switch.

It would be extremely dangerous for a machine tool to be switched on accidentally and operated unexpectedly. For this reason, the area around the tool is usually surrounded by a cage. When the machine tool is to be repaired or inspected, it can be approached through a door in the cage which has been furnished for that purpose. This door has a safety switch to prevent the machine tool from operating when the actuator, which is outside the cage, is accidentally activated.

This safety switch can be the switch for the machine tool's power supply. For example, a key can be hung by a short string on the door and a switch positioned in such a way that the key fits into the switch only when the door is closed. The power supply can then be switched on only when the door is closed and the key inserted.

However, with this prior-art type of safety switch, it is possible for the machine tool to be activated even though the key has not been inserted, if it should happen that some other object be accidentally inserted. Thus this switch is not failsafe. It might happen, for example, that vibration causes something to find its way into the switch when the door has not been closed and the key is not in the switch. The machine tool will then be activated unintentionally even though the door is open, and an accident may occur. This invention was designed with this scenario in mind.

The first object of this invention is to provide a key switch with better operating safety in light of the above problem.

The second object of this invention is to provide a further safety key switch which does not allow a key to open the door until the switch detects that the machine is completely stopped, in light of the following problem.

In an actual operation, there is still a possibility that inertia may cause the machine tool to continue to rotate after the door is opened, even though it is prevented from operating under power at that time. Safety cannot be guaranteed in such a case.

To produce a safety switch which can address this problem, a conventional key switch uses an electromagnetic solenoid and an auxiliary switch. The electromagnetic solenoid locks the key in place so that it cannot be removed freely from the switch, and the auxiliary switch is actuated by this solenoid. This auxiliary switch is connected in series with the internal main switch.

With this conventional safety switch, the electromagnetic solenoid is driven by a signal conveying the information that the rotation of the machine tool has ceased. This releases the lock on the key. Thus it is only when the machine tool has absolutely stopped operating that it becomes possible to extract the key to open the door. However, there is a likelihood that a rotation detector will make an error and a "rotation stopped" signal will be output even though the machine tool was actually rotating. The key could then be removed when the key lock was released, and the door could be opened. At this time the machine tool might still be rotating due to the effects of inertia. Since the auxiliary switch is switched off by the electromagnetic solenoid when the lock is released, this arrangement allows the machine tool to be stopped as soon as possible after the key is removed.

However, with the prior art key switch of the type described above, the electromagnetic solenoid and the auxiliary switch are a single unit, and the internal switch actuated by the key is connected in series to the auxiliary switch. This arrangement requires sufficient space to install both switches as well as space for the wiring between them, so the resulting switch is relatively large.

Furthermore, the use of two separate switches drives up the cost of the key switch. Production of such a switch requires a large number of processes, including the installation of the two switches and the laying of the wiring between them. These difficulties pose obstacles to the improvement of efficiency of assembly and productivity.

In view of these problems, the objective of this invention is to provide a key switch which features a solenoid to lock the key, and which uses only one internal switch. This enables the key switch to be downsized, and reduces the number of production processes. This in turn can lower production cost and improve assembly efficiency and productivity.

SUMMARY OF THE INVENTION

To attain the objective stated above, a key switch according to one embodiment of the present invention comprises a switching element; an actuator which, by changing position, actuates the switching element; and a rotating element with a guide to control its rotation. The rotating element changes the position of the actuator when it rotates. The key switch also has a lock which immobilizes the rotating element; a housing which encloses the actuator, rotating element and lock, with an opening into which a key can go; and a key which goes into the opening in the housing. When the key goes in, it disengages the lock which had immobilized the rotating element. The key engages with the guide and initiates the rotation of the rotating element.

With a switch according to this embodiment, the insertion of the key disengages the locking mechanism on the rotating element. The key also engages with the guide on the rotating element, thereby initiating the rotation of that element and activating the switching element. If an object other than the key is inserted, the lock on the rotating element will not be released, and the rotating element will be prevented from moving, so that the switching element cannot be activated.

Another embodiment of the present invention comprises a housing with a keyhole; a switching element within the housing; an actuator for the switching element, which is mechanically connected with the key inserted into the keyhole in the housing; an electromagnetic solenoid; a safety mechanism mechanically connected with the solenoid, which prevents the key from being removed; and a second actuator for the switching element which is mechanically connected with the solenoid.

The key switch of this embodiment can have the switching element and electromagnetic solenoid arranged in parallel.

In a key switch of this embodiment, the device to prevent the removal of the key can be, for example, either a lock on the first actuator or a lock which prevents the key from being withdrawn from the keyhole.

The lock on the first actuator mentioned above can, for example, be composed of a reciprocating cam whose movement depends on the action of the electromagnetic solenoid and a lock which engages with the first of the aforementioned actuators and is mechanically connected with this cam.

The lock on the first of the aforementioned actuators and the second of the aforementioned actuators, the one which actuates the switching element, can, for example, be realized as a single unit.

With this embodiment, a switching element is actuated by an actuator mechanically connected with a key and a second actuator mechanically connected with an electromagnetic solenoid. The key is prevented from being withdrawn by the action of a mechanism for that purpose which is mechanically connected with the electromagnetic solenoid.

Because it is actuated by an actuator mechanically connected with a solenoid, the switching element, an internal switch, can play the role performed by an auxiliary switch in prior art key switches. Thus, this key switch needs only a single internal switch.

BRIEF DESCRIPTION OF THE DRAWINGS

FIG. 3(A) is a side elevational view thereof; and FIG. 3(B) is a partial cutaway side elevational view of the drum in a different position thereof.

FIG. 4(A) is a front elevational view thereof; and FIG. 4(B) is a top view thereof.

FIG. 5(A) is a top view thereof; and FIG. 5(B) is a side elevational view thereof.

DETAILED DESCRIPTION OF THE PREFERRED EMBODIMENTS

First Embodiment.

The description of this embodiment is in reference to FIG. 1 through FIG. 17.

Figure 1:
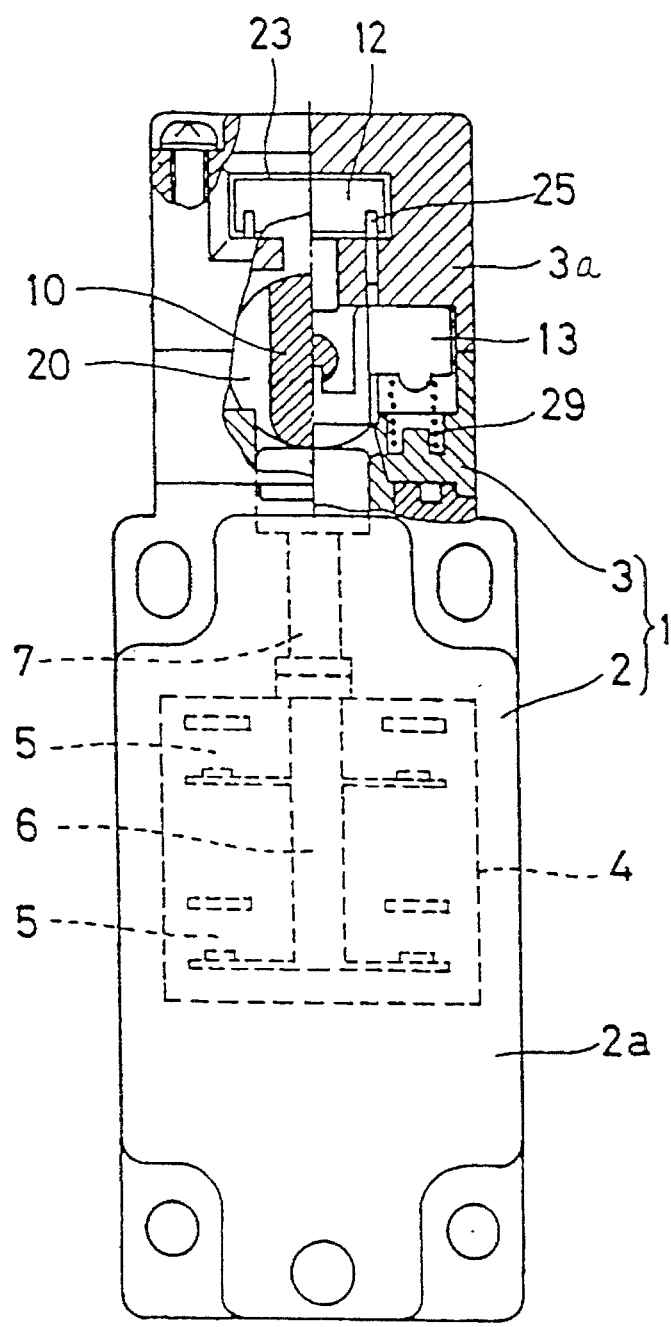
FIG. 1 shows a partial section of a front view of a first embodiment of the switch according to the present invention.
Figure 2:
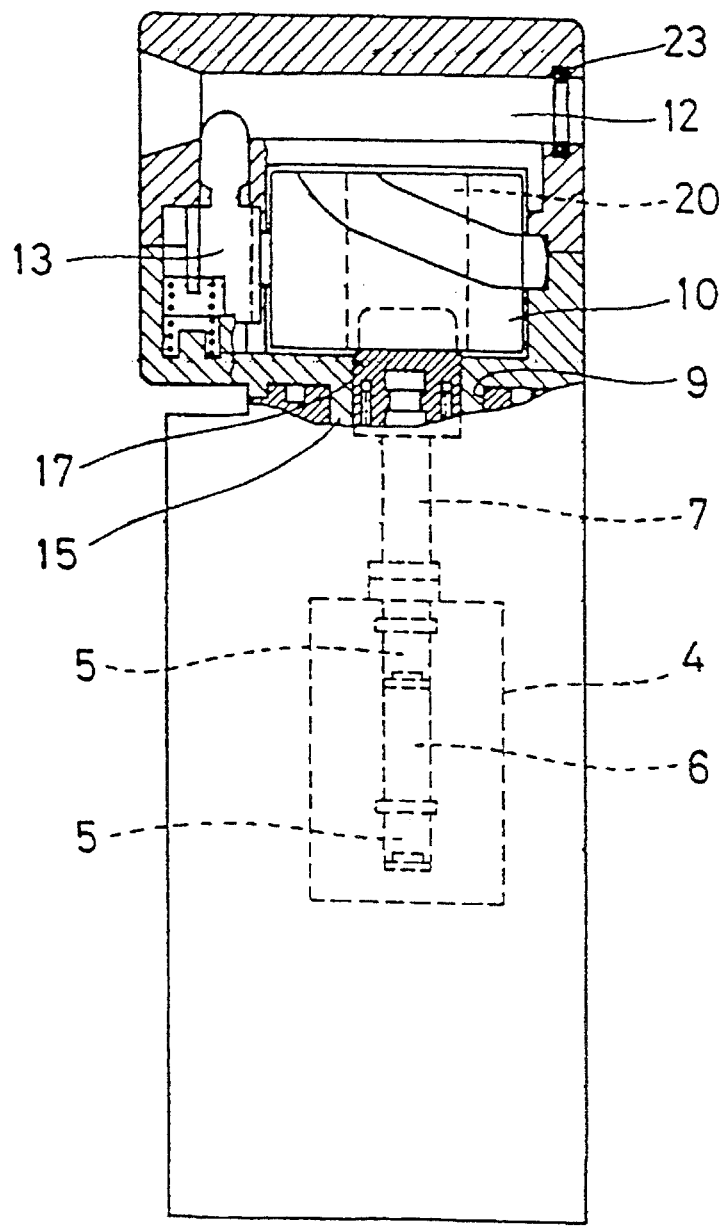
FIG. 2 shows a partial cross section of a side view of FIG. 1.

FIGS. 1 and 2 are cross sections of the interior of switch 1. The key switch of this embodiment consists of key 8 shown in FIGS. 5(A) and 5(B), which will be discussed later, and switch 1.

Switch 1 comprises switch unit 2 and head unit 3, which is affixed to the top of the switch unit 2. Casing 2a forms the exterior surface of switch unit 2. Inside this casing is switching element 4. In switching element 4 are two pairs of normally open contact mechanisms 5. The upper end of actuating element 6, which opens and closes contact mechanisms 5, is on the upper surface of switching element 4. Plunger 7, the actuator, is seated on top of the upper end of actuating element 6. The head of plunger 7 protrudes from opening 9, which is on the top of casing 2a.

Drum 10, the rotating element, is mounted in the center of the lower portion of the interior of casing 3a, which forms the exterior of head 3. Drum 10 is mounted in such a way that it can rotate back and forth around its axis of rotation. There is an opening 12 for key 8 which is open to the upper portion of drum 10, and there is lock fitting 13 (the locking mechanism) which extends to the same height as the upper surface of drum 10. Projection 15 protrudes downward from the lower portion of head casing 3a. The projection and the casing are, in this example, formed from a single piece of material. When head unit 3 is mounted on switch unit 2, projection 15 is fitted into the opening 9. The aforementioned plunger 7 fits into sleeve 17, which is formed on projection 15. The top of the plunger is held in contact with the bottom of drum 10 by the tension of a spring.

Figure 3A:
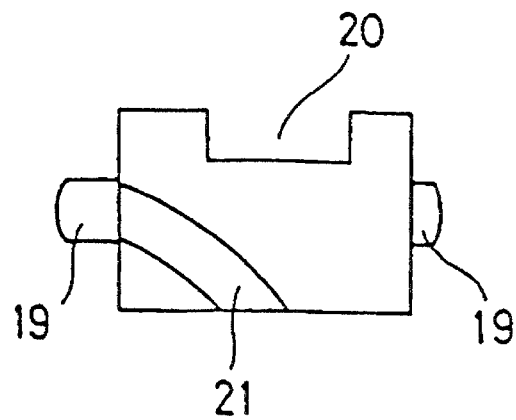
FIGS. 3(A) and 3(B) show the drum shown in FIG. 1.
Figure 3B:
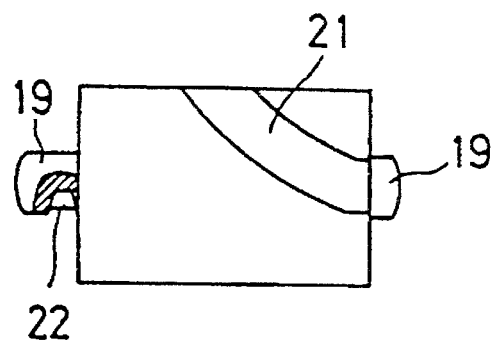

The aforesaid drum 10, which is shown in FIGS. 3 (A) and (B), has shaft supports 19 on either end. On one portion of its outer surface is slot 20. On the portion of the surface not occupied by slot 20 is groove 21, the guide for the rotation of the drum, which runs from the front end toward the rear end of drum 10. The shaft 19 supporting the front of the drum is longer than that on the back. On the lower surface of shaft 19 is slot 22, into which the locking mechanism 13 engages.

At the end of keyhole 12 for the aforementioned switch unit 2 is O ring 23, as shown in FIG. 2.

Figure 4A:
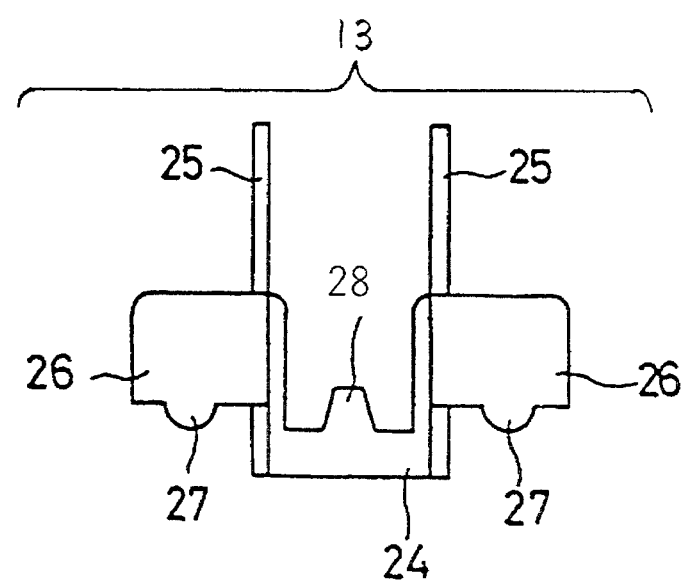
FIG. 4(A) and 4(B) show the locking mechanism of FIG. 1.
Figure 4B:
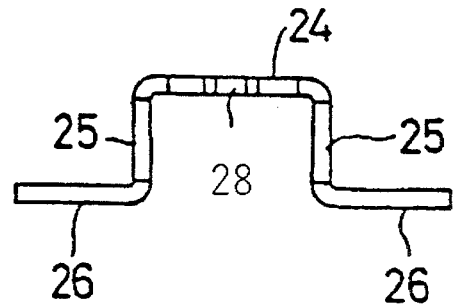

The locking mechanism 13, which can be seen in FIGS. 4 (A) and (B), is, in this example, formed by pressing, cutting and bending a segment of sheet metal. It consists of a base 24, which from the side resembles a flattened letter U; two protuberances 25, which protrude upward from the top of base 24 on opposite sides; two lateral members 26 on opposite sides of base 24; two protuberances 27 on the bottoms of members 26, and formed as a single piece with them, for the purpose of attaching springs; and a locking tooth 28, which projects upward from the middle of base 24. Locking mechanism 13 has two springs 29 which are attached to protuberances 27. These springs serve to keep the mechanism upright when it is not engaged by the key.

Figure 5:
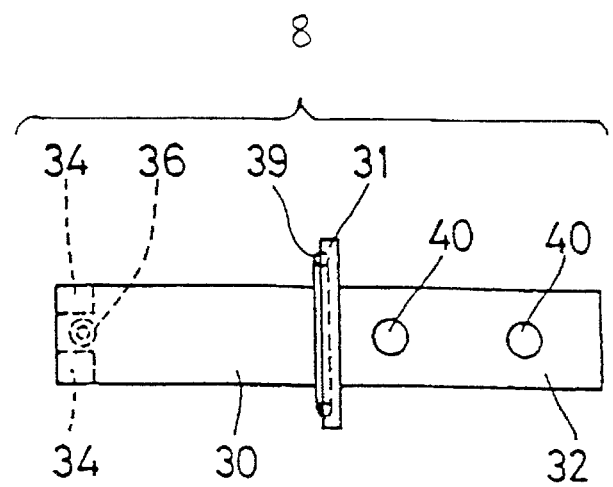
FIGS. 5(A) and 5(B) show the key for the embodiment of FIG. 1.
Figure 5:
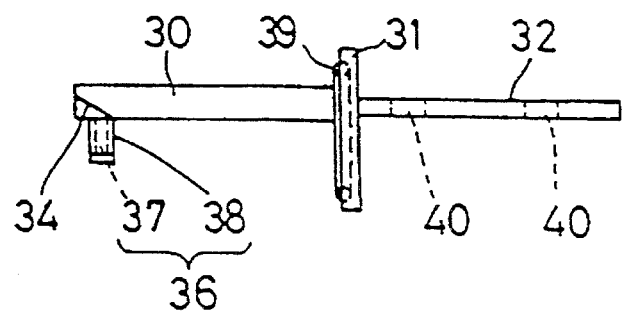

As can be seen in FIGS. 5 (A) and (B), key 8 is flat. It consists of stem 30, the portion which is inserted into keyhole 12 in switch 1; stop 31, which comes in contact with the surface of switch 1 when the key is inserted; and mount 32, which extends back from stop 31, to fasten the key to the door. On both the left and right sides of the tip of stem 30, the lower edges of the tip have beveled portions 34. Between these two beveled edges 34 protrudes a pin 36. This pin 36 consists of a metal shaft 37 on which a sleeve 38 is mounted in such a way that it can rotate. Around the circumference of the surface of stop 31 which comes in contact with the switch 1 is O-ring 39, which fits into a depression on the switch 1 in order to create a seal. Mount 32 has two holes 40 by which it can be mounted on the door (not shown).

With a key switch of the configuration described above, switch 1 can be mounted on the edge of the door frame in the cage surrounding a machine tool, while key 8 is mounted on the door. When the door (not shown) is closed, the stem portion 30 of key 8 will be inserted into keyhole 12 on switch 1.

The operation of the above-described key switch is described in as follows:

When the door is open, key 8 is not inserted in keyhole 12 in switch 1. In other words, key 8 must be removed from key hole 12 in switch 1 to open the door (not shown). When key 8 is removed from key hole 12, the forward end of groove 21 on the outer surface of drum 10 is in an upward position, and slot 20 is to the side. Slot 22 on forward supporting shaft 19 is on the underside of the drum 10.

Since slot 20 is now on the side of the drum 10, as described above, plunger 7 of drum 10 is now compressed to its maximum breadth. This depresses actuating element 6 of switching element 4 so that contacting mechanisms 5 are separated and thus switch off, as shown in FIGS. 1 and 2. In this way the power supply for the machine tool is switched off any time the door is left open to insure a safe working environment. At the same time, slot 22 on shaft support 19 is facing downward. Locking tooth 28 on locking mechanism 13, which projects upward, engages in slot 22 to prevent drum 10 from rotating. Thus if vibration occurs or an object is accidentally inserted in keyhole 12 when key 8 is not being used, drum 10 will be prevented from rotating, even if this object should engage in slot 21. Switching element 4 therefore cannot be switched on by accident, and a high level of safety is insured.

Figure 6:
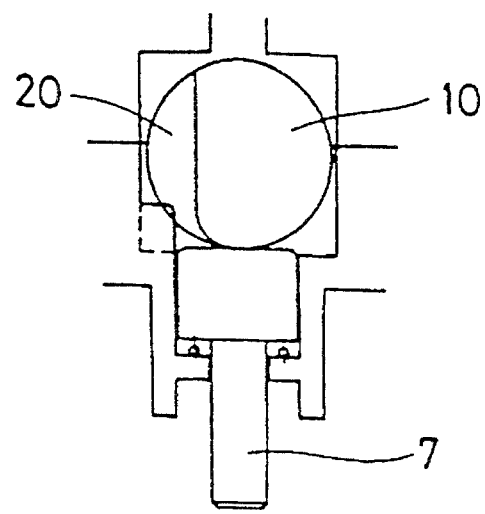
FIGS. 6(A), 6(B) and 6(C) illustrate the operation of the switch according to the first embodiment.
Figure 6:
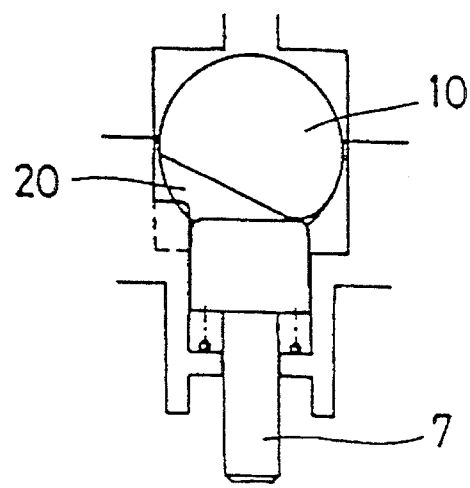
Figure 6:
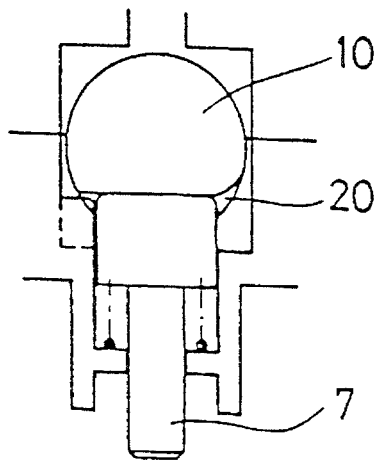

When the operator leaves the machine tool and the door is closed, the stem portion 30 of key 8 is inserted in keyhole 12 on switch 1. When the key is inserted, the tip of stem 30 pushes down on protuberances 25 On locking mechanism 13. This causes locking tooth 28 on mechanism 13 to move downward and disengage from slot 22 on the supporting shaft 19. Drum 10 is now free to rotate, and as the key is inserted further, pin 36 travels forward in groove 21. Drum 10 rotates as shown in FIG. 6 (B). When stem 30 is inserted fully, the drum rotates as far as the position shown in FIG. 6 (C). Thus the insertion of key 8 causes drum 10 to rotate 90°. As the drum 10 rotates, slot 20 on its surface comes to face downward, and the top of plunger 7 begins to engage in the slot. When drum 10 has reached its maximum rotation, the top surface of plunger 7 comes in contact with the bottom surface of slot 20, where it has reached its maximum elevation.

When plunger 7 rises, actuating element 6 on switching element 4 is moved upward by the spring force. This causes contacting mechanisms 5 to go on, which in turn causes the power supply for the machine tool to go on. Thus it becomes possible to activate the machine tool.

Because the edges 34 have been beveled on the lower surface of the tip of the aforementioned key 8, protuberances 25 on locking mechanism 13 are depressed smoothly when key 8 is inserted in the keyhole. Relative to pin 36, sleeve 38 is mounted on metal shaft 37 in such a way that it is free to rotate. This enables pin 36 to travel smoothly in groove 21 by rotating its sleeve 38 rather than scraping against the sides of the groove.

When key 8 is inserted into the keyhole 12, O-ring 23 shown in FIGS. 1 and 2 on the inner periphery of the keyhole contacts the peripheral surface of the stem portion 30 of the key, and O-ring 39 shown in FIG. 5(A) and (B) next to stop 31 on key 8 contacts the inner edge of keyhole 12 on head 3. Thus, keyhole 12 is sealed front and rear to prevent minute particles or oil from entering switch 1 when the machine tool is operated. This prevents irregularities in the rotation of drum 10, the operation of plunger 7 and the contacting of mechanisms 5.

When the aforementioned key 8 is extracted from the keyhole, the same operations occur in the opposite order. In other words, plunger 7 goes down, and switching element 4 switches off. Locking mechanism 13 goes back up, and drum 10 is immobilized.

Figure 7:
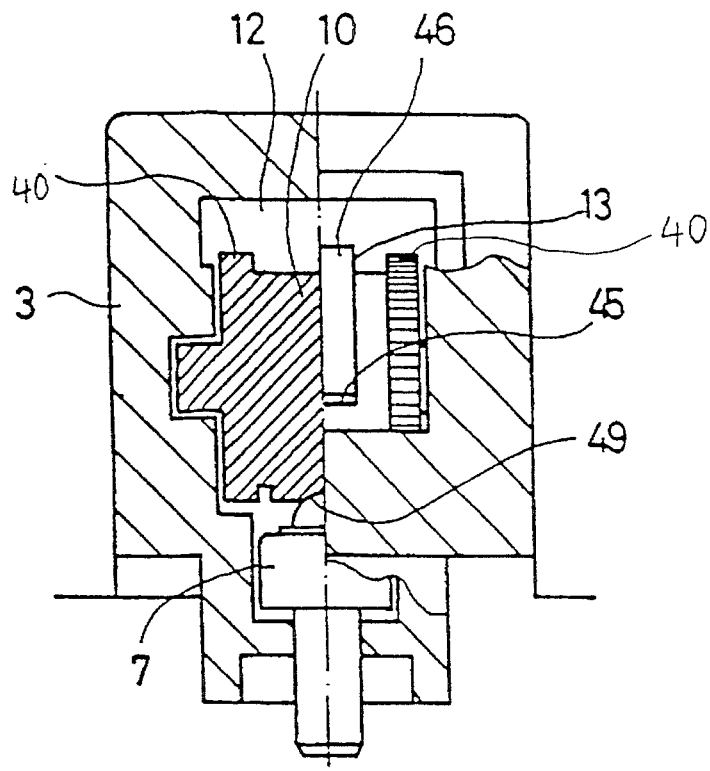
FIG. 7 shows a partial cross section of a second embodiment of the head of the first embodiment switch.
Figure 8:
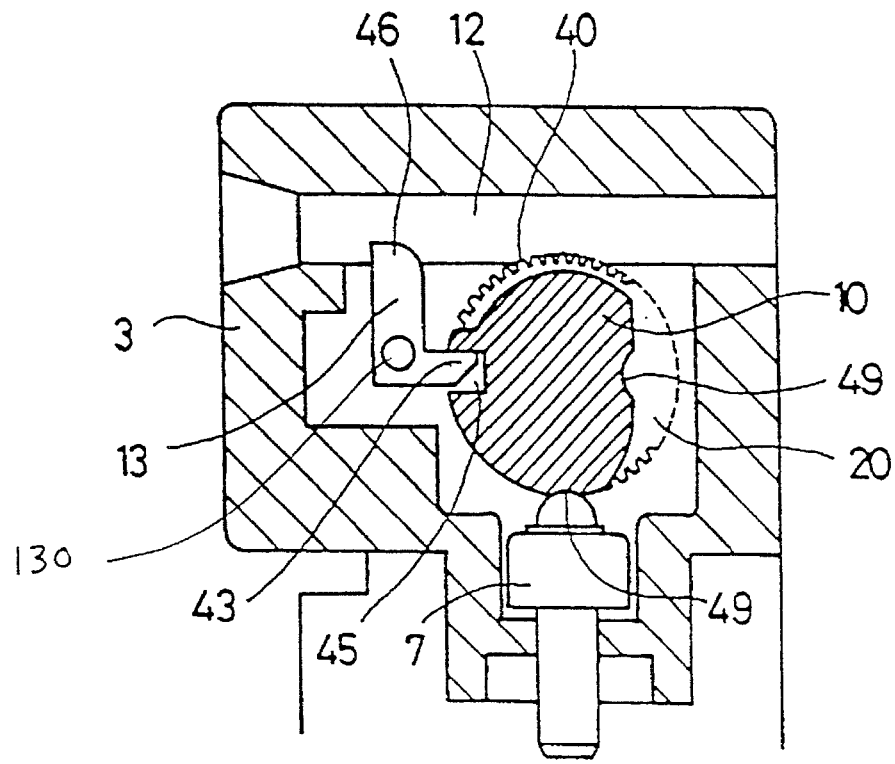
FIG. 8 shows a side cross section of FIG. 7.
Figure 9:
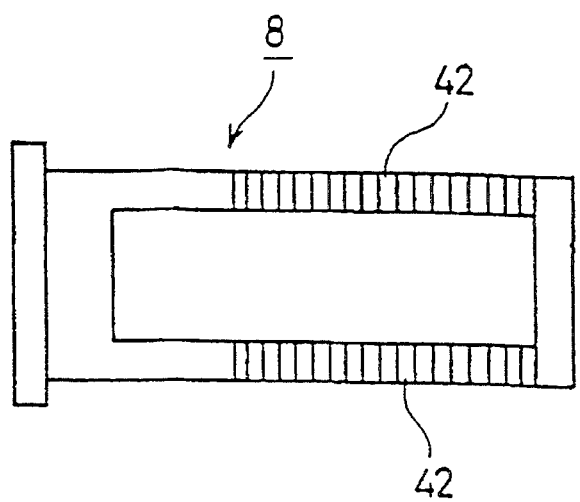
FIG. 9 shows a bottom view of the key for the second embodiment head shown in FIG. 7.
Figure 10:
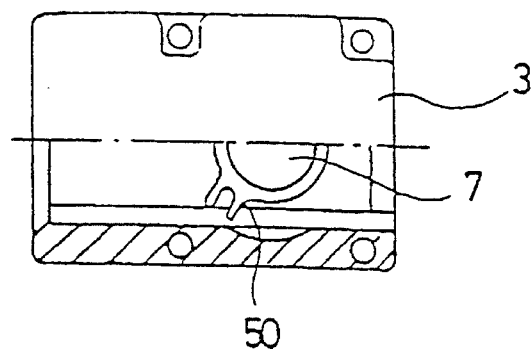
FIG. 10 shows a cross section of a third embodiment of the head of the first embodiment switch as viewed from the top.
Figure 11:
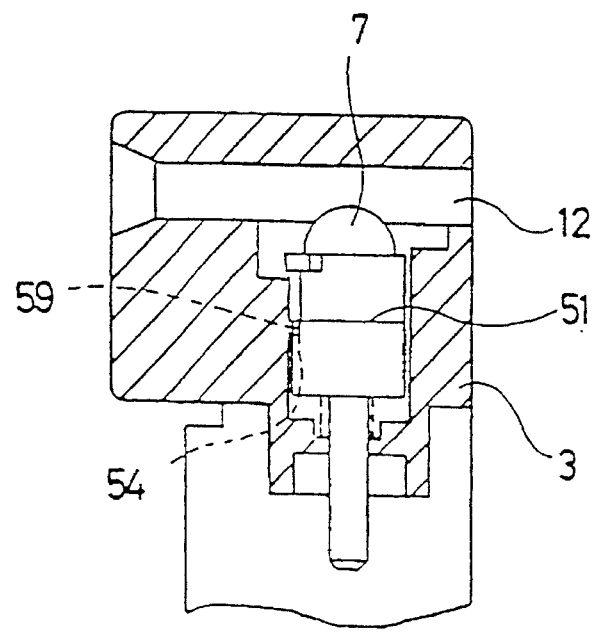
FIG. 11 shows a side cross section of FIG. 10.
Figure 12:
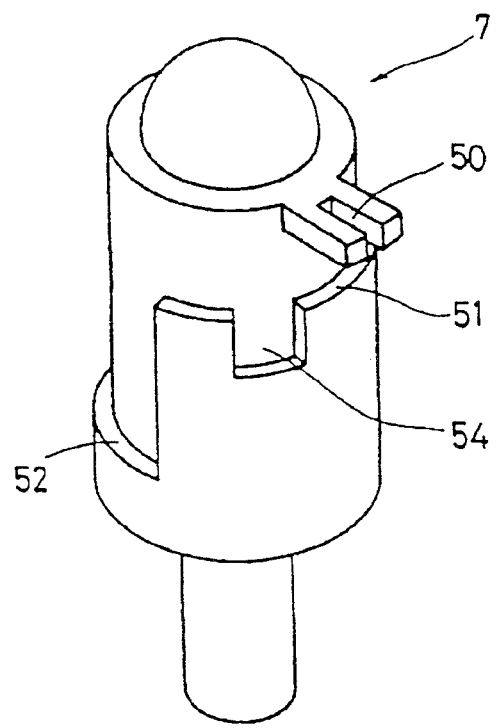
FIG. 12 shows a perspective view of the plunger of the third embodiment head.
Figure 13:
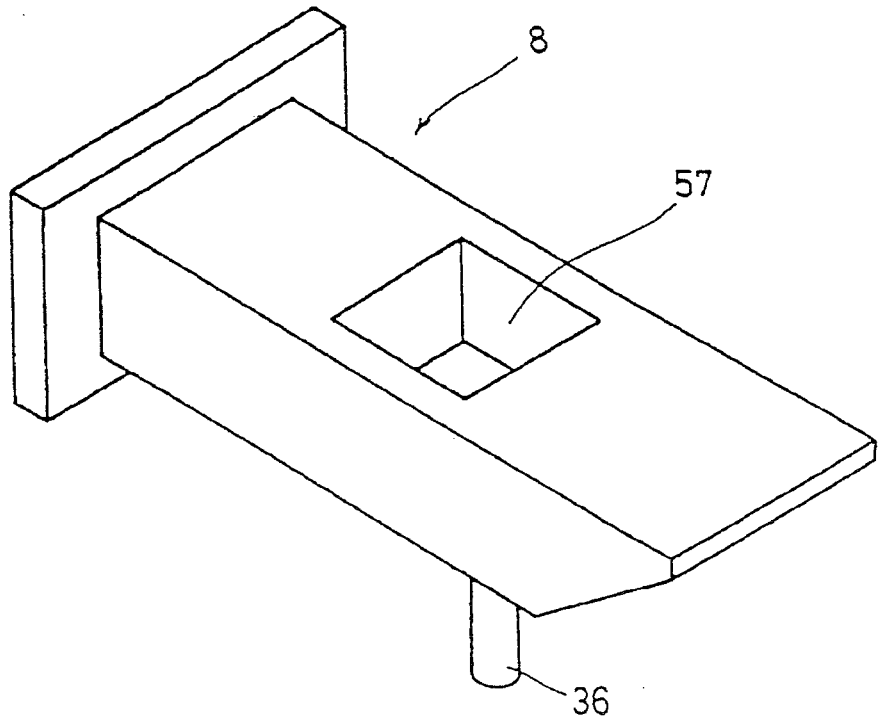
FIG. 13 shows a perspective view of the key of the third embodiment head.

FIGS. 7–9 show a second embodiment of the head which has a different locking arrangement. In this embodiment head, drum 10 is installed in head 3 in such a way that it can rotate around an axis of rotation which is at right angles to keyhole 12. To guide the rotation of drum 10, two gears 40 are provided on either side of the outer surface of the drum. On the undersurface of key 8 are gear teeth 42, which can be seen in FIG. 9. In front of the drum 10 in head 3 is a locking mechanism 13, which works by engaging tooth 43 in slot 45 on drum 10. Mechanism 13 is mounted in such a way that it is free to rotate about a pivot 130. Normally, its end 46 projects upward into keyhole 12.

With this configuration, the portion of drum 10 with the greatest diameter pushes down on the head of plunger 7 when key 8 is not inserted in the keyhole. This causes switching element 4 to go off just as in the first embodiment. When key 8 is inserted into keyhole 12, its tip pushes on the upper end 46 of locking mechanism 13, thus causing this mechanism to rotate. As it rotates, tooth 43 is released from slot 45 in drum 10, thus freeing the drum to rotate. When key 8 is inserted, its gear teeth 42 engage with gears 40 on drum 10, causing the drum to rotate. As drum 10 rotates, plunger 7 goes up and switching element 4 switches to an on position. On the peripheral surface of drum 10 are two depressions 49, which set the respective positions the head of plunger 7 will take when key 8 is inserted or removed.

FIGS. 10–17 illustrate a third embodiment of the head which has another different locking arrangement, which is still another modification of the above-described first switch. In this example, the switch has a plunger 7 which is a single piece with the drum, and a key 8. Plunger 7 is mounted so that it rotates around a vertical axis of rotation. On its upper edge is a catch 50 for a pin 36, shown in FIG. 14. Its peripheral surface, while continuous, is cut into two separate levels, 51 and 52. On the upper level, 51, is a slot 54. Key 8 has an opening 57 into which fits the head of plunger 7.

Figure 14:
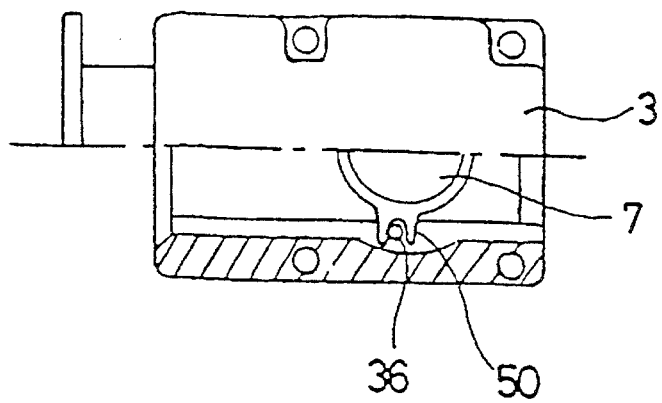
FIG. 14 shows a cutaway top cross section of the third embodiment head, illustrating its operation.
Figure 15:
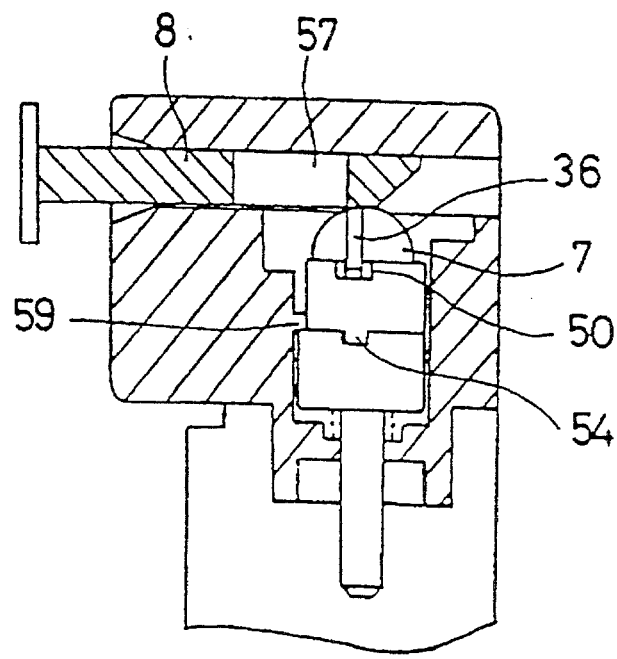
FIG. 15 shows a side cross section of the third embodiment head, illustrating its operation.
Figure 16:
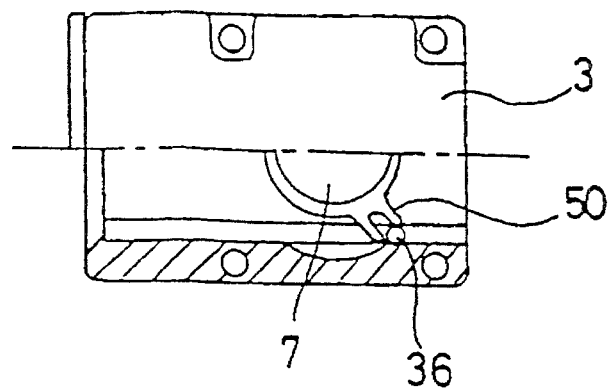
FIG. 16 shows a front cross section of the third embodiment head, illustrating its operation.
Figure 17:
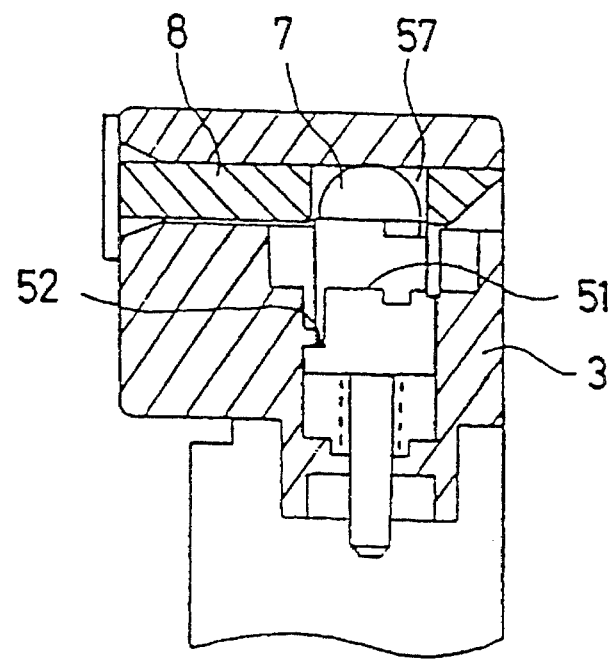
FIG. 17 shows a side cross section of the third embodiment head illustrating its operation.

With this configuration, projection 59 on the inside of head 3 will engage in slot 54 on plunger 7 when key 8 is not inserted in the keyhole. When plunger 7 is raised, switching element 4 moves to its off position. When key 8 is inserted, it will depress the head of plunger 7, and pin 36 will engage in catch 50. When plunger 7 is depressed, projection 59 will be released from slot 54, as shown in FIGS. 14 and 15. When pin 36 engages in catch 50, plunger 7 will be made to rotate, and the surface of the upper level 51 of the plunger will move relative to projection 59. The insertion of key 8 will also cause the head of plunger 7 to go into opening 57 in the key so that the plunger will rise, as shown in FIGS. 16 and 17. Plunger 7 becomes free to rise when the plunger drops, from upper level 51 to lower level 52, relative to projection 59. When plunger 7 rises, switching element 4 goes on.

With the above-described embodiment of the present invention, the insertion of the key 8 releases the locking mechanism 13 which immobilizes the rotating element, shown here as drum 10. When the key 8 engages, it initiates the rotation of the rotating element and actuates the switching element. If an object other than the key 8 is inserted or vibration occurs, the rotating element will not rotate and the switching element 4 will not be actuated. This invention, then, provides a key switch with better operating safety.

Second Embodiment

A further embodiment of a key switch according to this invention will now be described in reference to FIGS. 18–40.

Figure 18:
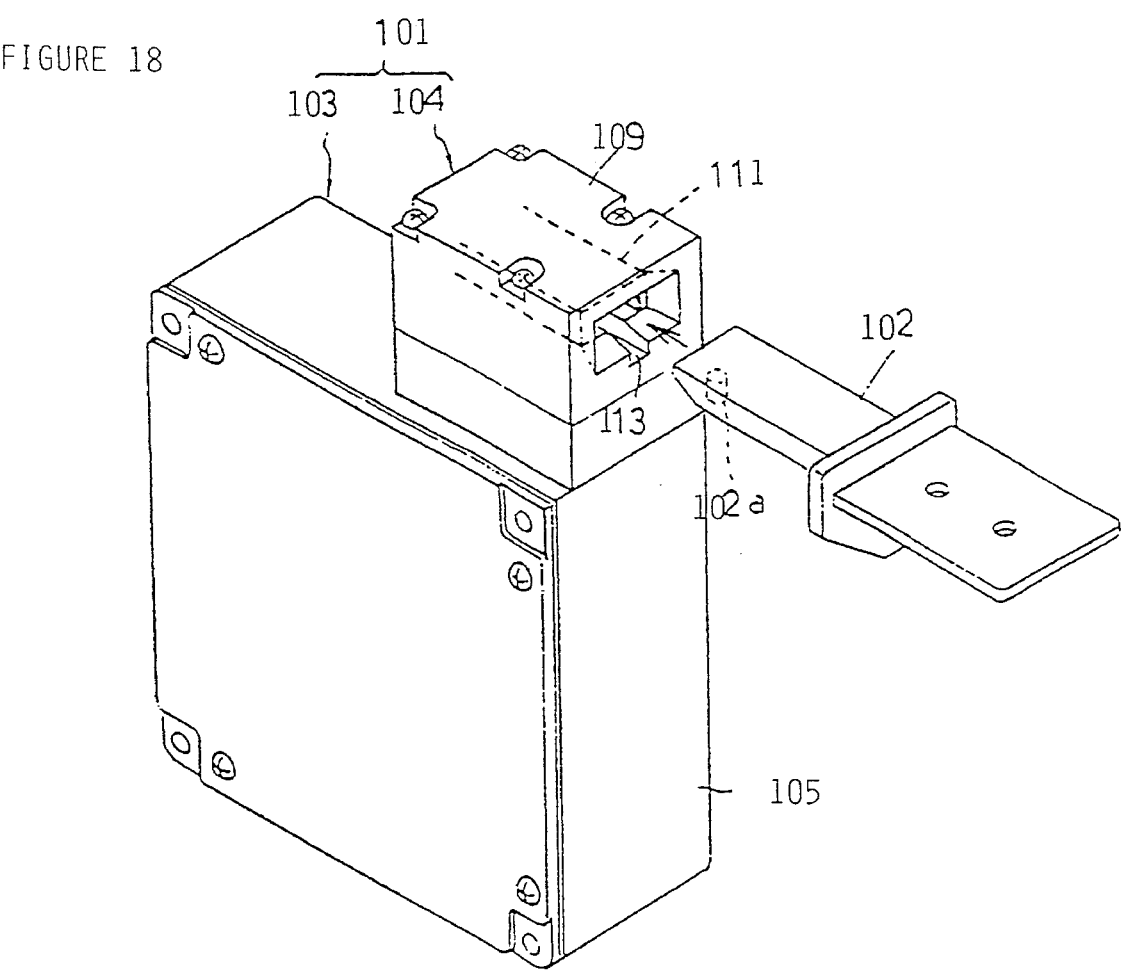
FIG. 18 shows a perspective view of the exterior of a second embodiment of the key switch according to the present invention.

The key switch of this embodiment is composed of switch 101 and key 102, as shown in FIG. 18. Switch 101 comprises switch unit 103 and head unit 104, which is attached via screws or bolts, onto the top of unit 103.

Figure 19:
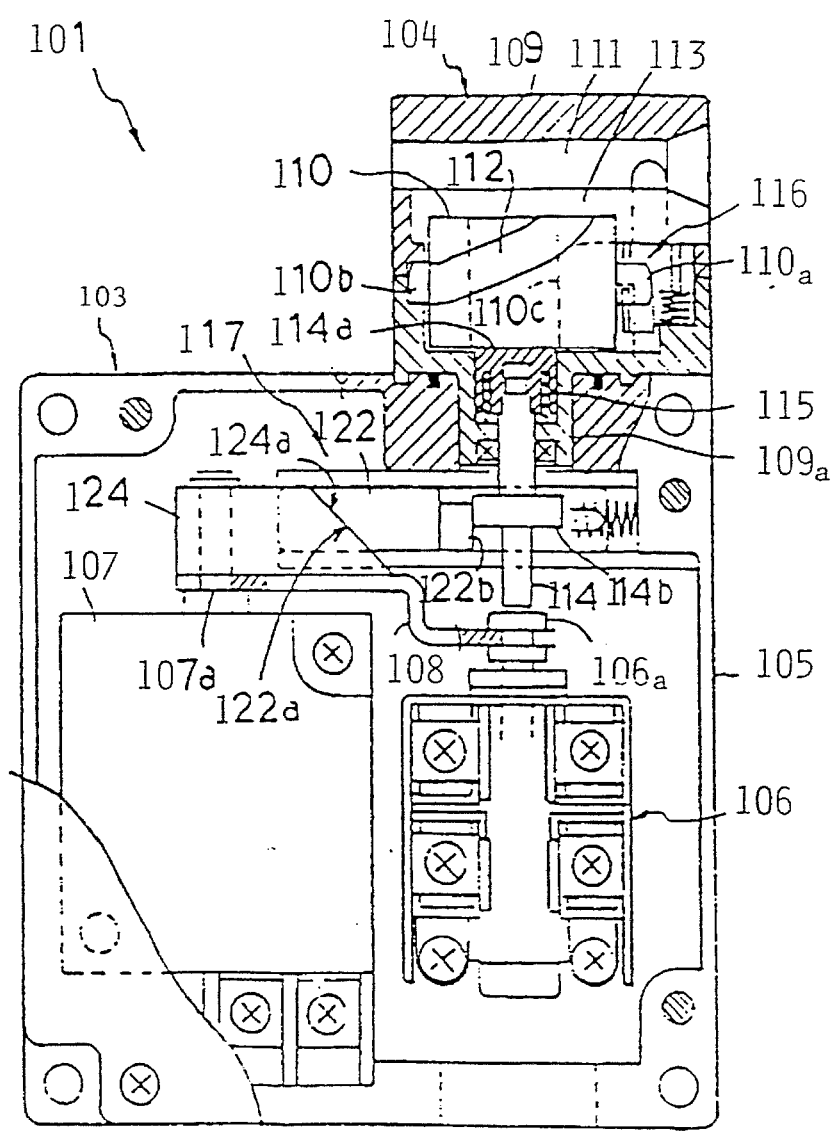
FIG. 19 shows a cutaway side elevational view of the second embodiment switch with the key removed.
Figure 20:
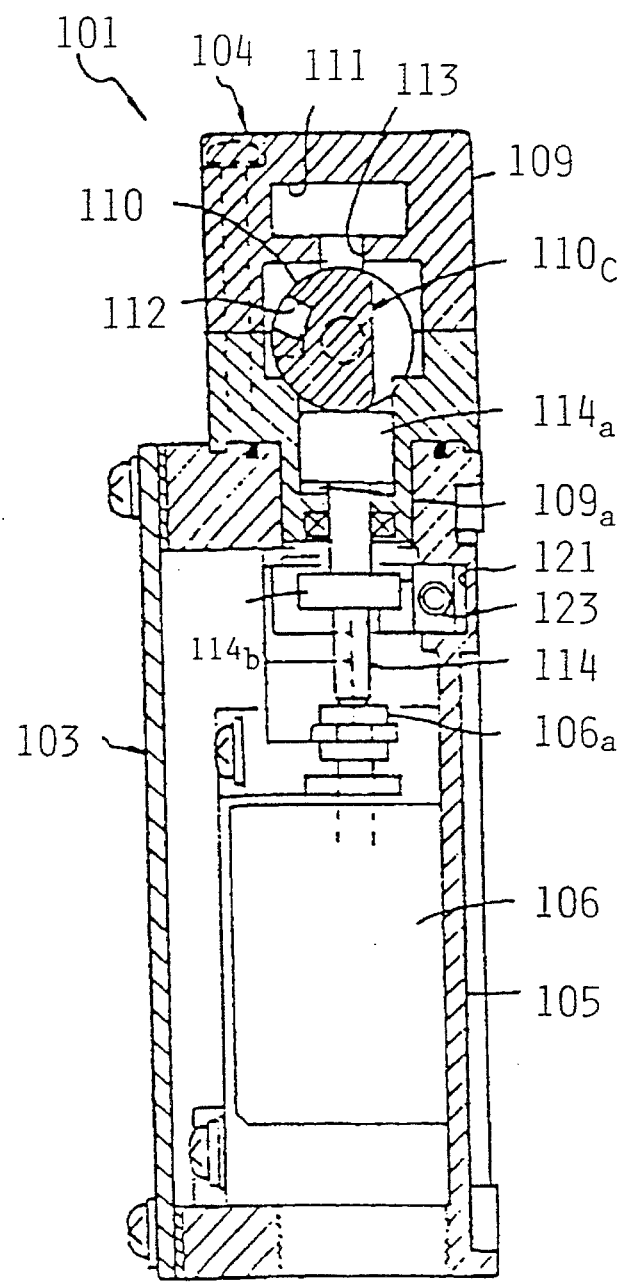
FIG. 20 shows a cross sectional front view of the second embodiment switch with the key removed.
Figure 21:
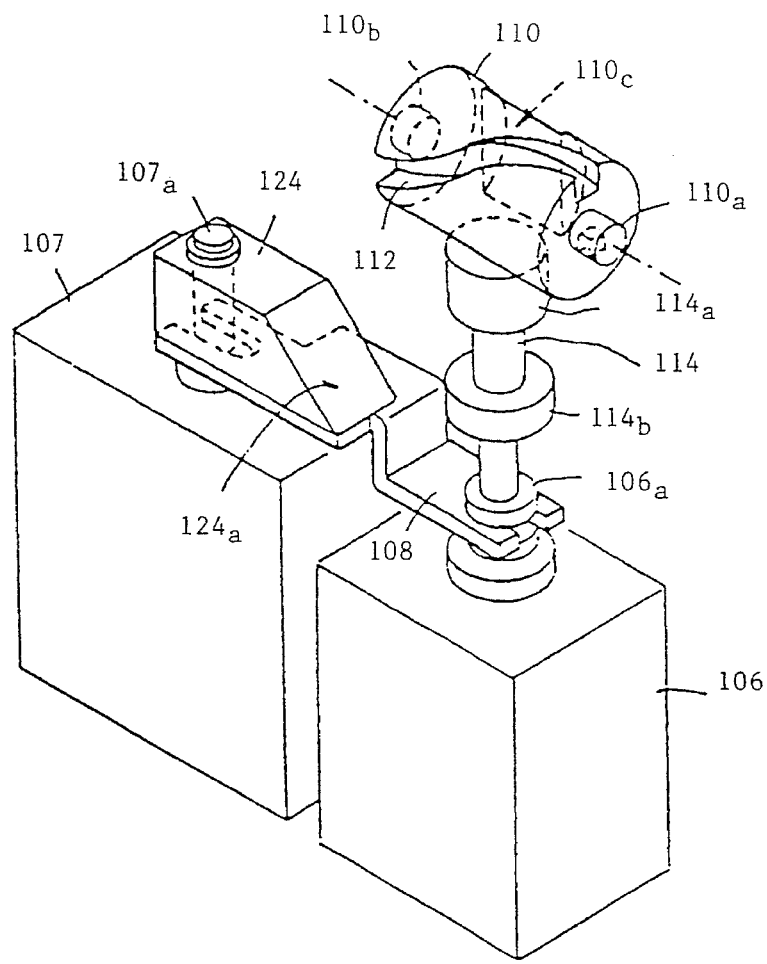
FIG. 21 shows a perspective view of the actuation mechanism of the second embodiment switch.

As shown in the cutaway drawings in FIGS. 19 and 20, switch housing 105 is a box which functions as an outer casing for switch unit 103. Inside of the housing 105 are switching element 106, which switches the power supply circuit for the machine tool on and off, and electromagnetic solenoid 107, which actuates element 106. These components may be arranged in parallel fashion, left and right, within the housing 105. Switching element 106 closes an internal contact (not pictured) when actuator 106a, a shaft which can move up and down, goes up, and it opens the internal contact when it goes down. Electromagnetic solenoid 107 has an actuator shaft 107a, which also can move up and down. Shaft 107a is normally propelled upward by the impetus of an internal spring (not pictured), but it is returned to its original position electromagnetically when the solenoid is energized. Shaft 107a and the previously mentioned actuator 106a are connected by coupling arm 108; together they form the second actuator. In other words, switching element 106 is switched on when actuator shaft 107a moves upward, and it is switched off when an electrical signal is sent to electromagnetic solenoid 107.

Head housing 109, which encloses the aforementioned head unit 104, is divided into an upper and a lower segment. Inside this housing, rotary cam 110, a short round cylinder, is mounted horizontally in such a way that it can rotate freely about its axis on support shafts 110a and 110b, at its two ends. Over rotary cam 110 is a keyhole 111, which runs parallel to the camshaft. On the outer surface of rotary cam 110, groove 112 runs from one end of the cam to the other, making over its length a rotational shift of 90°. Guide slot 113, which leads actuator pin 102a of key 102 to groove 112, runs along the length of aforementioned keyhole 111 just below its midpoint.

The housing specified for this embodiment consists of the aforementioned switch housing 105 and housing 109.

On the bottom of the front of the aforementioned key 102, which is inserted into keyhole 111, is actuator pin 102a, which engages in groove 112 on rotary cam 110 by passing through the aforementioned guide slot 113. As key 102 is inserted or withdrawn, actuator pin 102a moves forward or back in a straight line along guide slot 113. When actuator pin 102a engages in groove 112, rotary cam 110 rotates clockwise or counterclockwise, following the motion of the key 102.

Plunger 114, which functions as the actuator for the switch, is supported by boss 109a on the lower portion of head housing 109 in such a way that it is free to move up and down. The upward impetus imparted by spring 115 causes the head 114a of the plunger to maintain itself in contact with the lower surface of the aforementioned rotary cam 110. One portion of the outer surface of rotary cam 110 with which the aforementioned head 114a of the plunger comes in contact has a flat niche, depression 110c, cut out of it. When the key 102 is withdrawn, as shown in FIGS. 19 and 20, portion 114a of plunger 114 comes in contact with the rounded surface of rotary cam 110, and plunger 114 is forced downward. When key 102 is inserted, rotary cam 110 is rotated 90°and depression 110c in cam 110 ends up facing downward. Plunger 114 is then forced upward by spring 115.

The lower end of plunger 114 is maintained in contact with the upper end of actuator 106a on the aforesaid switching element 106. As was described above, when key 102 is withdrawn, plunger 114 is forced downward by rotary cam 110. Actuator 106a on the switching element 106 is forcefully depressed by plunger 114, defeating the spring tension which forced actuator shaft 107a upward. In this way switching element 106 is switched off.

The aforementioned head unit 104 has a first locking mechanism 116 to prevent cam 110 from rotating when the key is not inserted. Switch housing 105 has a second locking mechanism 117 to prevent key 102 from being withdrawn when it is inserted into head unit 104.

Figure 22:
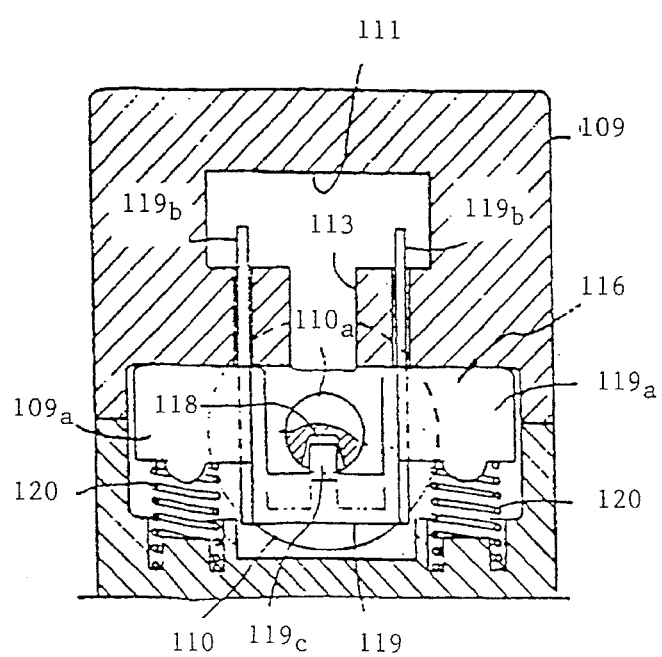
FIG. 22 shows a cross sectional front view of the first locking mechanism with the second embodiment switch is locked.
Figure 23:
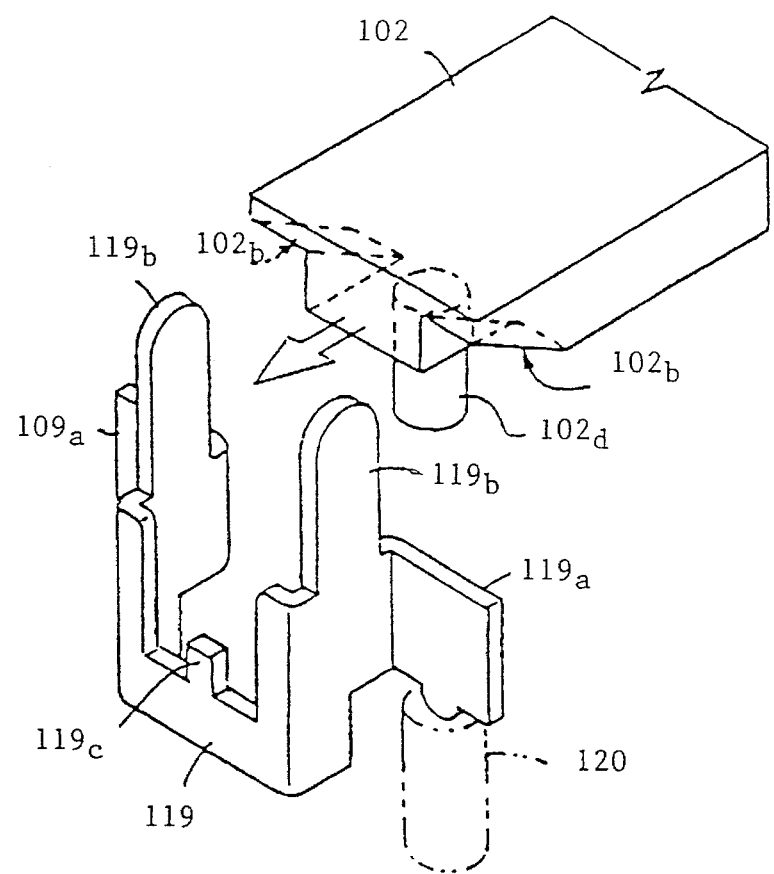
FIG. 23 shows a perspective view of the components of the first locking mechanism of the second embodiment switch.

First locking mechanism 116 is shown in FIGS. 22 and 23. Lock fitting 119 is made to engage in slot 118 on the underside of support shaft 110a which is at one end of rotary cam 110 by spring 120. This prevents cam 110 from rotating. Lock fitting 119, which is pictured in FIG. 23, is made by bending a piece of sheet metal. On both sides it has panels 119a, against which the springs are seated. Its upper edge is formed into two actuators 119b, which release the lock. In the center of the fitting is tooth 119c, which engages in slot 118 on the aforesaid support shaft 110a. The aforesaid release actuators 119b extend downward near the opening on the inside of keyhole 111.

The first locking mechanism 116 is released as soon as key 102 begins to go into the keyhole. Beveled edges 102b on the underside of the tip of key 102 come in contact with the aforesaid release actuators 119b and push them downward. Lock fitting 119 overcomes the upward spring bias moving downward. Tooth 119c disengages from slot 118, and rotary cam 110 becomes free to rotate. As insertion of key 102 continues, cam 110 is caused to rotate further, as described above.

Figure 24:
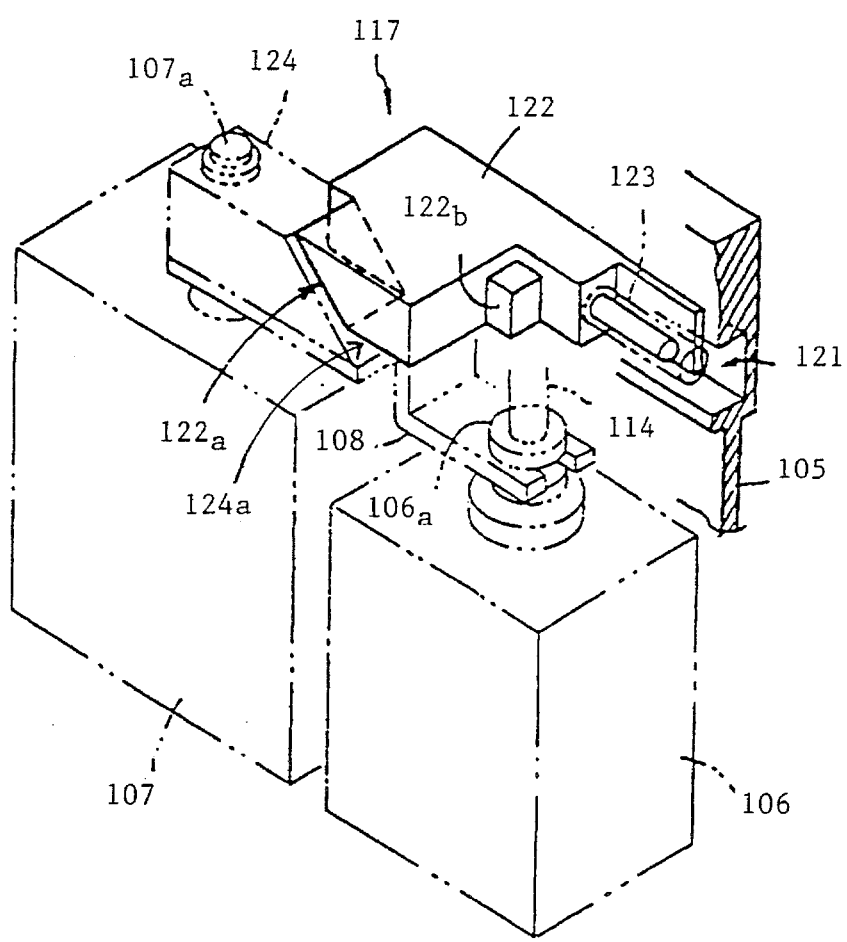
FIG. 24 shows a perspective view of the components of the second locking mechanism of the second embodiment switch.

The second locking mechanism, 117, is pictured in FIG. 24. It consists of lock 122, which can slide along guide slot 121 on the inside of switch housing 105; spring 123, which applies a force tending to slide lock 122 in one direction, which releases the lock; and cam 124, which, by pushing forcefully in the other direction (the direction which secures the lock), overcomes the spring force and actuates lock 122. Cam 124 is rigidly attached to actuator shaft 107a on the aforesaid electromagnetic solenoid 107. The cam ends in a beveled edge, 124a, which comes in contact with the beveled edge 122a of lock 122. When the key 102 is inserted, actuator 106a on switching element 106 and actuator shaft 107a on electromagnetic solenoid 107 are pushed down by plunger 114, as shown in FIG. 19, so that the switch is switched off. Cam 124 drops; consequently, lock 122 is compelled by the spring force to slide to the left (with respect to FIG. 24).

When the key 102 is inserted and rotary cam 110 begins to rotate, plunger 114 moves upward, as discussed above. The aforesaid actuator 106a and actuator shaft 107a, which do not at this time prevent the plunger from moving upward, are forced up by the spring force. As cam 124 moves upward, beveled edges 124a and 122a cause lock 122 to overcome the spring force and slide to the right (with respect to FIG. 24). The force which spring 123 here exerts on lock 122 is set so as to be less than the rightward component of the force exerted on lock 122 through beveled edges 124a and 122a.

In the center of lock 122 is projection 122b. As was described above, lock 122 is forced to slide to the right when plunger 114 goes up. When this happens, the aforesaid projection 122b extends beyond the edge of flange 114b on plunger 114 at its bottom surface. This prevents plunger 114 from going down. Because plunger 114's downward movement is prohibited, rotary cam 110, with which the plunger engages on the surface having the depression, is also prevented from rotating. Thus key 102, which is interlocked with rotary cam 110 through groove 112 and actuator pin 102a, is prevented from being withdrawn.

The key switch of this invention as described above has been described. The operation of this switch is now described as applied to a safety switch in the door of a protective fence surrounding a machine tool.

When the door is open, key 102 is not in switch 101. Plunger 114 is down, as shown in FIG. 19, and switching element 106 is switched off. Locking mechanism 116 is locked to prevent the rotation of cam 110. With the switch locked in this way, vibration cannot cause cam 110 to rotate, nor can the cam be made to rotate by a screwdriver or other instrument inserted into keyhole 111.

Whenever the door is open, then, the power supply circuit is absolutely certain to be disconnected, and there is no possibility that the power supply could be connected accidentally.

When the door is closed, key 102 is inserted in switch 101. As it enters the keyhole, the aforesaid locking mechanism 116 is released. The insertion of key 102 causes the rotary cam 110 to rotate through the working of groove 112 and actuator pin 102a. Depression 110c on cam 110 comes to face the top of plunger 114, thereby causing that plunger to rise. When plunger 114 goes up, actuator 106a on switching element 106 and actuator shaft 107a on electromagnetic solenoid 107, not impeded in their upward movement, are both forced upward. Switching element 106 is switched on, and the power supply for the machine tool is actuated.

Figure 25:
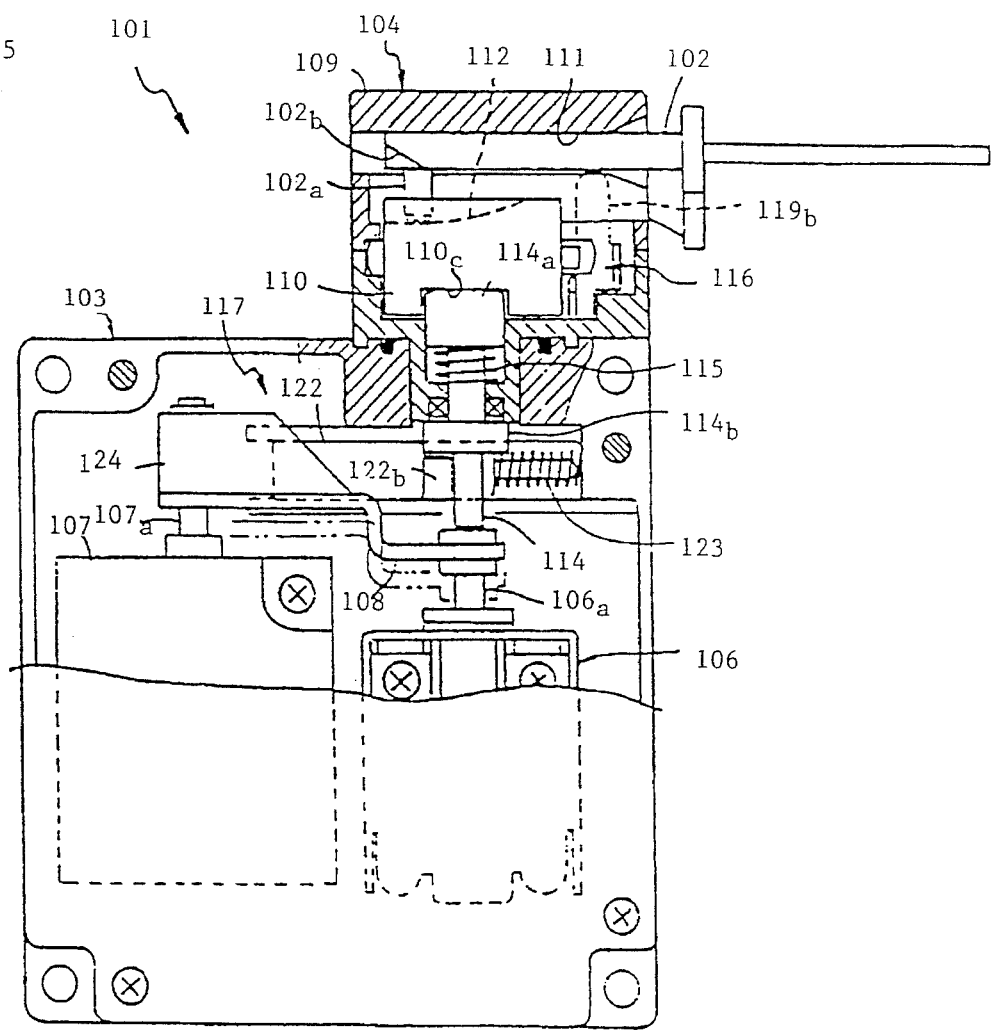
FIG. 25 shows a cutaway side view of the second embodiment switch with the key inserted.
Figure 26:
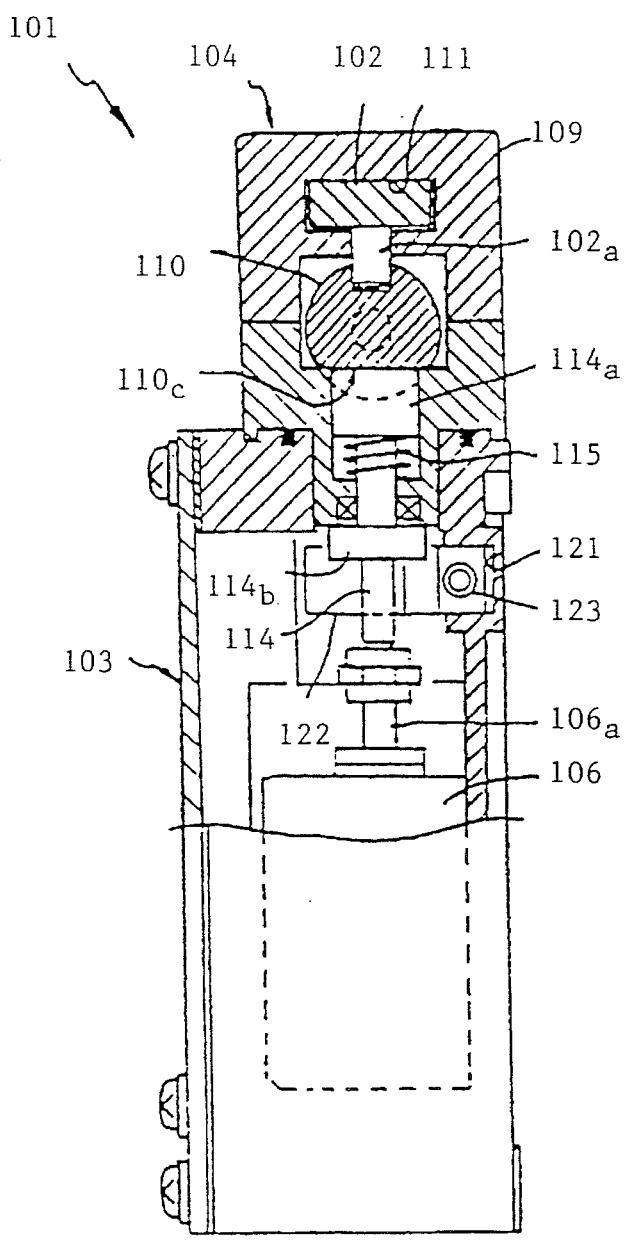
FIG. 26 shows a cutaway front view of the second embodiment switch with the key inserted.

When plunger 114 goes up, lock 122 on locking mechanism 117 is pushed to the right by cam 124. Projection 122b on lock 122 extends under the bottom of flange 114a on plunger 114, as shown in FIG. 25. Plunger 114 is thus prevented from going down. As a result, cam 110 is prevented from rotating, and key 102 cannot be removed (i.e., the key is locked).

When the door is to be opened for inspection or maintenance of the machine tool, the operation of the tool is first halted by means of an external control. A signal indicating that the operation of the tool has completely stopped is sent by a rotation detector on the machine tool to electromagnetic solenoid 107. This frees actuator shaft 107a to move downward, overcoming spring force as shown in FIG. 25. Actuator 106a on switching element 106 goes down together with shaft 107a, so that the switch is switched off. When shaft 107a goes down, lock 122 in locking mechanism 117 moves to the left, the lock is released, and plunger 114 becomes free to go down. Cam 110 also becomes free to rotate, which means that key 102 can be withdrawn and the door can be opened.

When the door is opened and key 102 is withdrawn, rotary cam 110 is forced to rotate and plunger 114 goes down, working against spring 115, as pictured in FIG. 19.

FIGS. 27 to 30 show a still further embodiment which has a basic configuration identical with the embodiment shown in FIGS. 18–26, and which will be described only to those points which differ from the previous example. Portions or components identical to those in the previous example are labeled with the same numbers.

In this embodiment, electromagnetic solenoid 107 is arranged so that its actuator shaft 107a protrudes horizontally next to switching element 106. Lock arm 140, which is connected to shaft 107a, has the functions of both coupling arm 108 and locking mechanism 117 in the first embodiment.

Lock arm 140 consists of a higher segment 140a, which is connected to shaft 107a, a lower segment 140b, which ends in a tip, and an oblique segment 140c between the two. The tip of segment 140b goes into guide slot 142, which is cut into the inner surface of housing 105. The inside of the housing also has a projection 145 with a hole 144 to guide the actuation of plunger 114, which passes through it.

Figure 27:
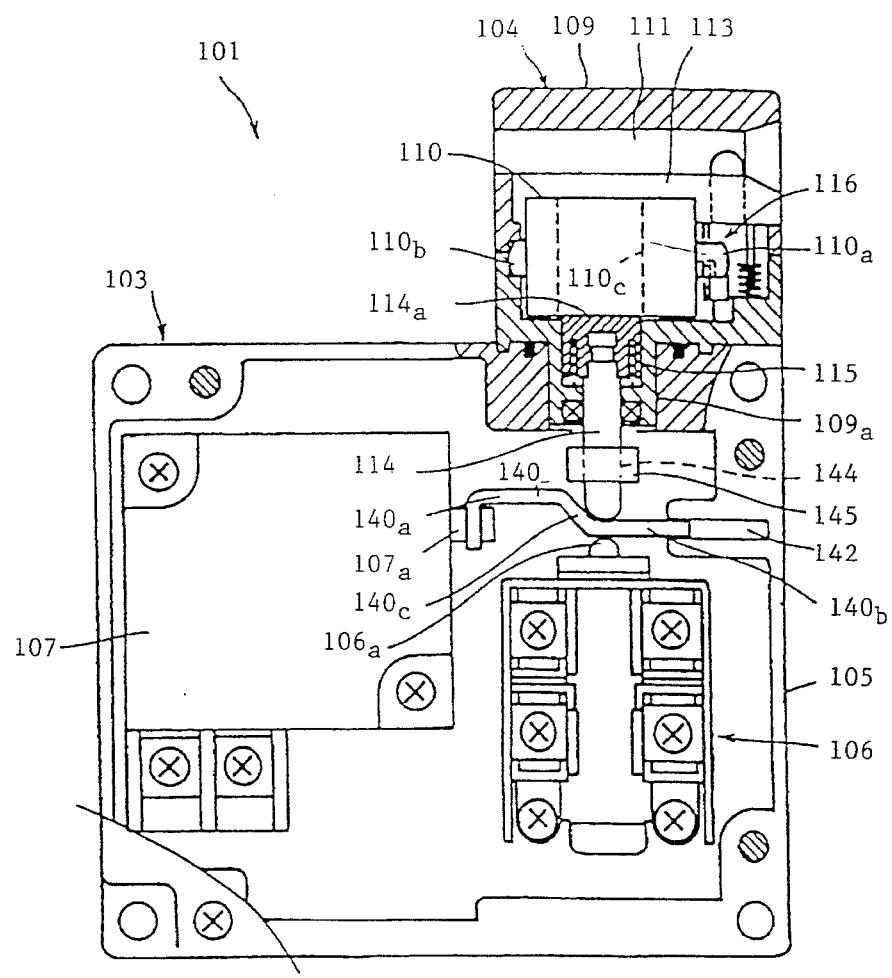
FIG. 27 shows a cutaway side view similar to FIG. 19 with the key removed.
Figure 28:
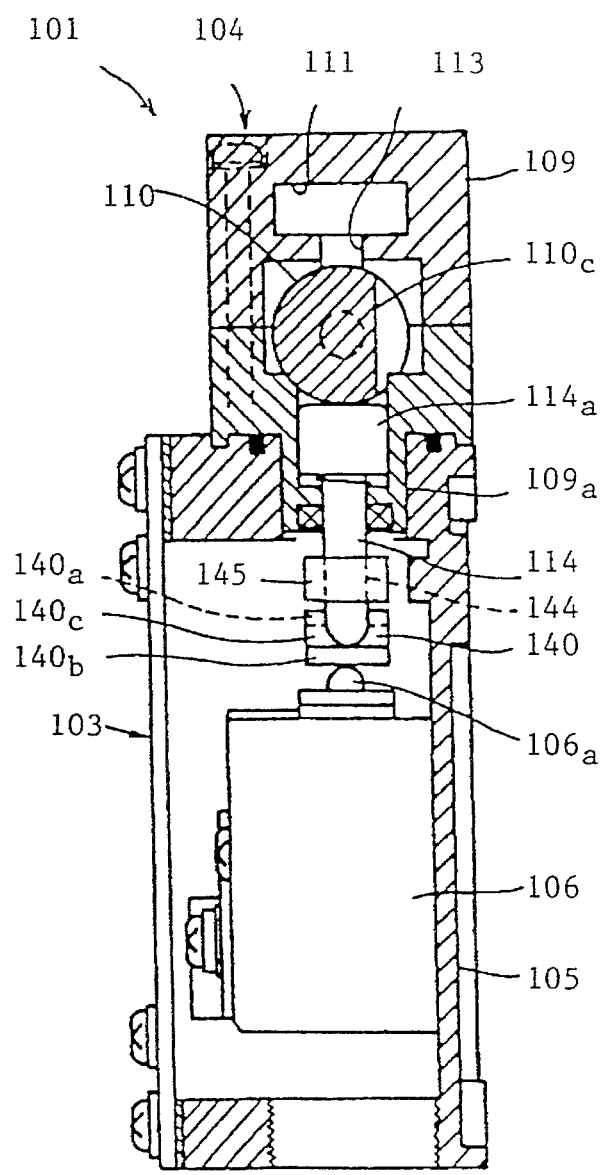
FIG. 28 is a cutaway front view of FIG. 27 with the key removed.

As can be seen in FIGS. 27 and 28, when key 102 is not in the switch and electromagnetic solenoid 107 is not driven, the bottom of plunger 114 is in contact with the top surface of segment 140b, and the bottom surface of segment 140b is in contact with the upper end of actuator 106a. In the normal state, when electromagnetic solenoid 107 is not energized, lock arm 140 is biased by a spring force to protrude. However, under the condition described above, i.e., when key 102 is not in the switch, plunger 114 is held down, so that the plunger holds segment 140c in position, with lock arm 140 is maintained in the retracted position as shown in FIG. 27.

Figure 29:
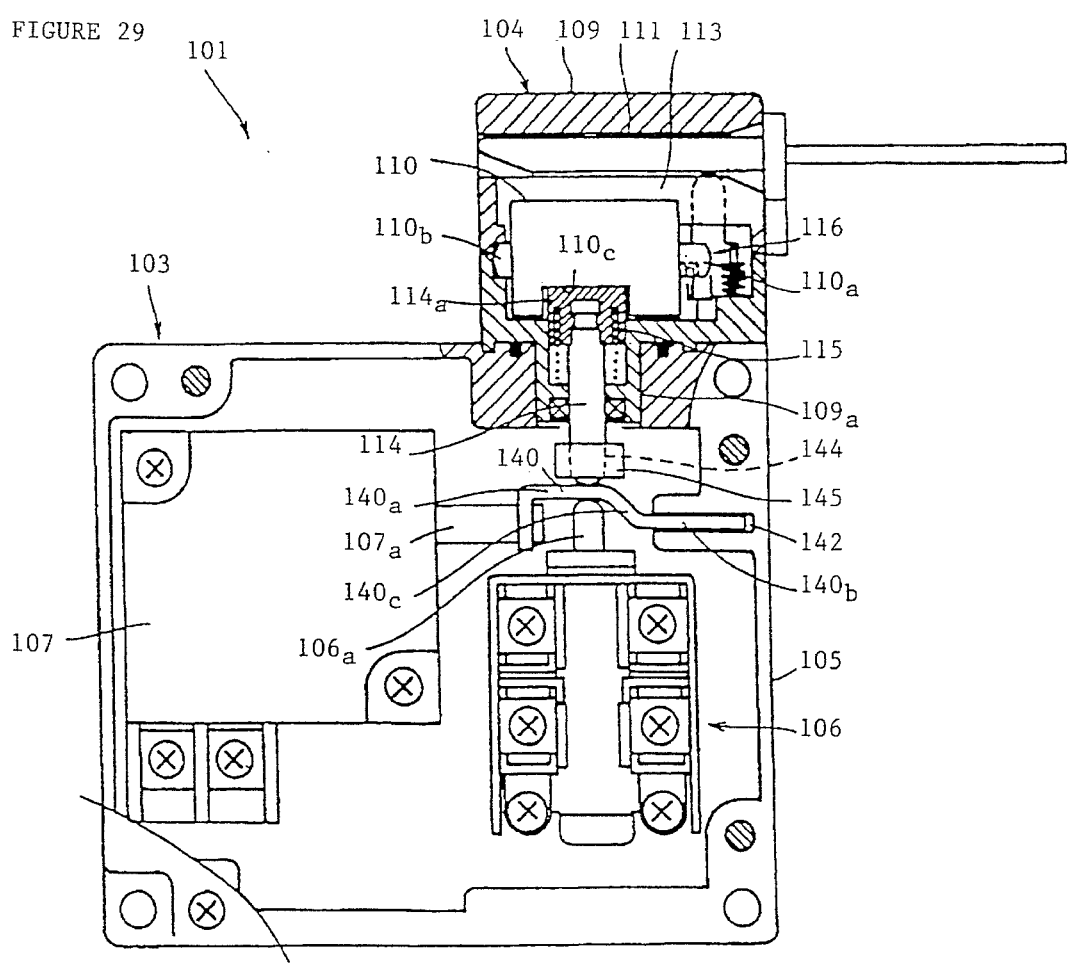
FIG. 29 is a cutaway side view of the locking mechanism of FIG. 27 when locked.
Figure 30:
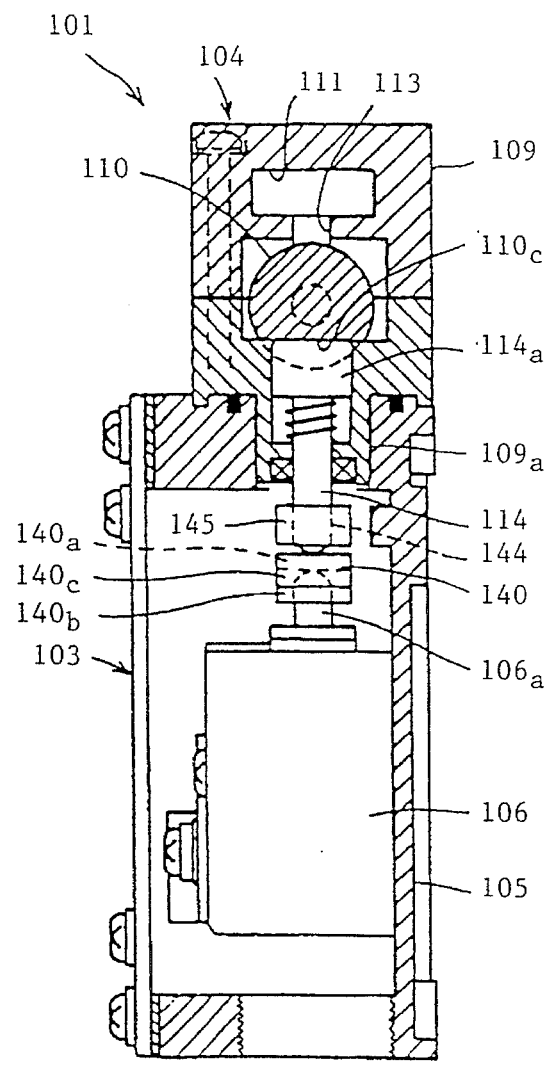
FIG. 30 is a cutaway front view of FIG. 27 when locked.

When key 102 is inserted and plunger 114 goes up, it ceases to impede the movement of oblique segment 140c. Lock arm 140 will then protrude as shown in FIGS. 29 and 30, and this allows actuator 106a to rise in order to maintain its contact against the bottom of lock arm 140, which in turn causes switching element 106 to go on. Should someone try to withdraw key 102 at this time, he would be prevented from doing so. The bottom of plunger 114 is held in position in the depression on cam 110 and by being in contact with the top of segment 140a, so it is impossible for the plunger to go down, and key 102 cannot be withdrawn. Plunger 114 is locked, and key 102 is prevented from being removed while the machine tool is operating.

When a signal is received from the rotation detector indicating that the machine tool has completely stopped, electromagnetic solenoid 107 is energized, causing actuator shaft 107a to be drawn back. Lock arm 140 is also drawn back, returning the switch to the state illustrated in FIGS. 27 and 28. Thus switching element 106 is switched off, the lock on plunger 114 is released, and it becomes possible to remove key 102.

Figure 31:
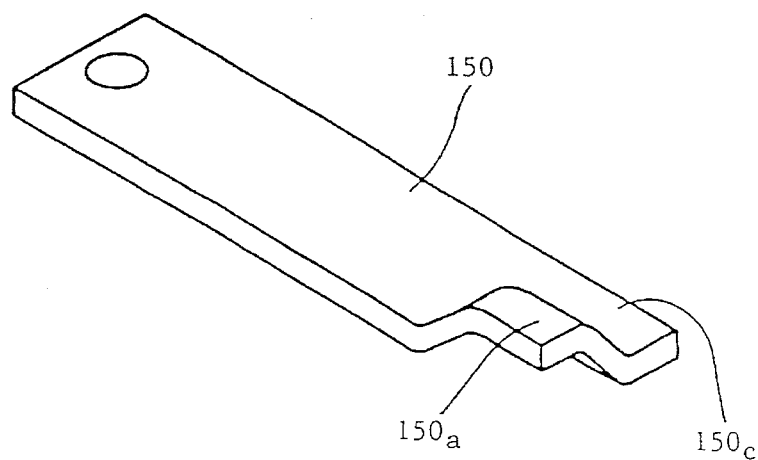
FIG. 31 is a cutaway side view similar to FIG. 19 with the key removed.
Figure 32:
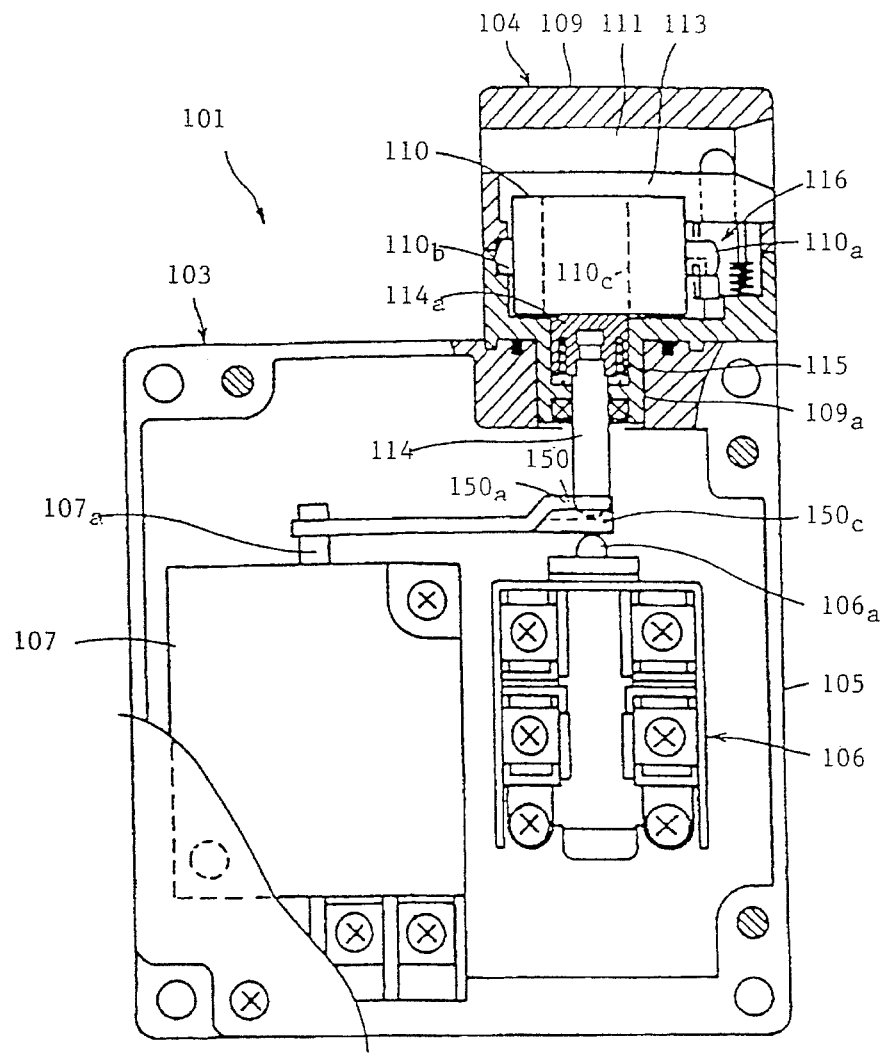
FIG. 32 is a perspective view of the lock arm of FIG. 31.
Figure 33:
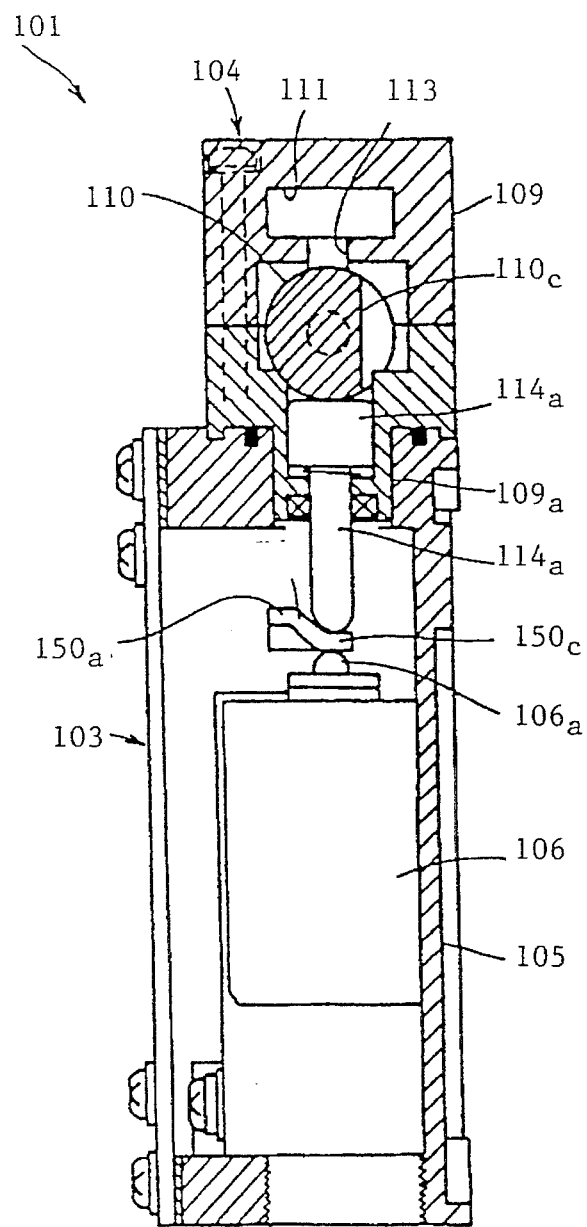
FIG. 33 is a cutaway front view of FIG. 31 with the key removed.
Figure 34:
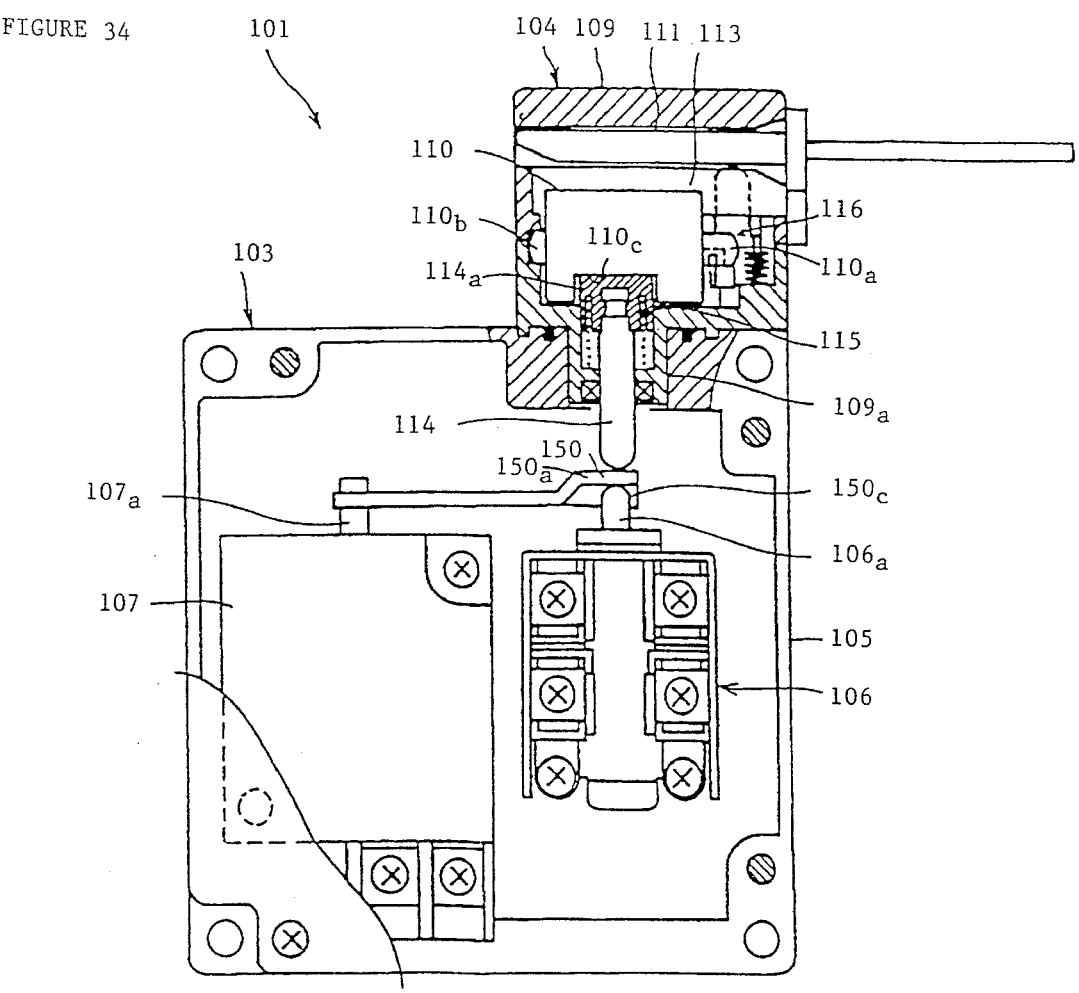
FIG. 34 is a cutaway side view of FIG. 31 when locked.
Figure 35:
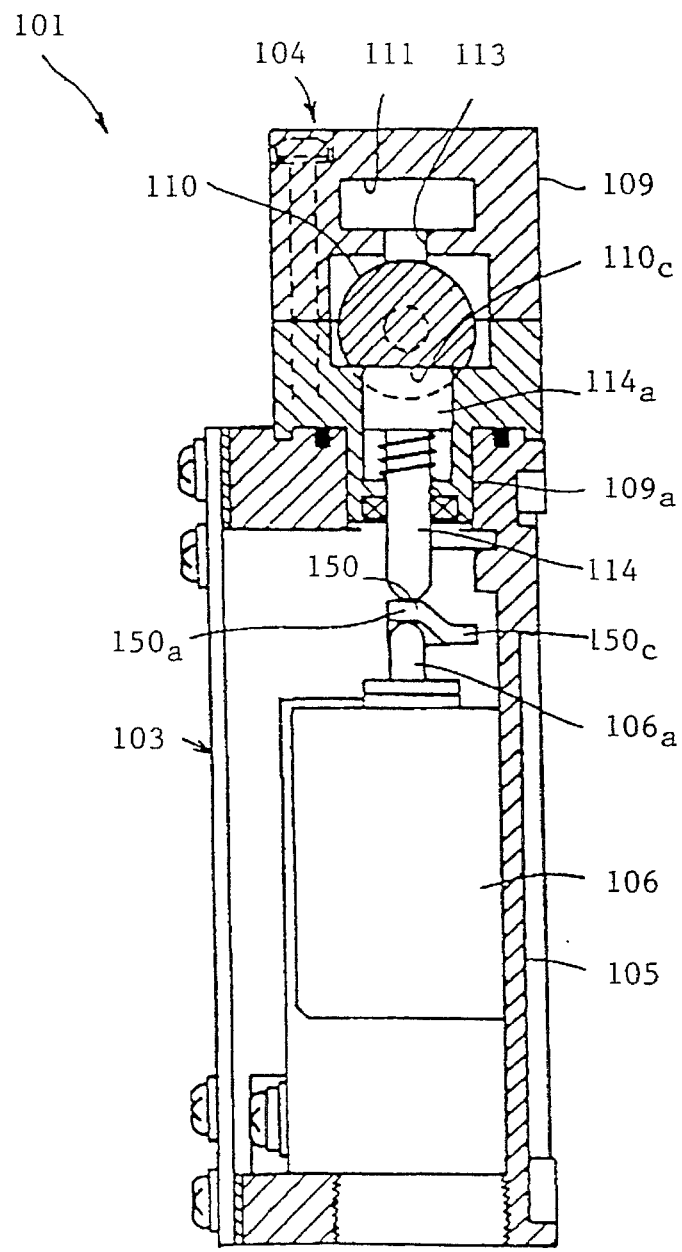
FIG. 35 is a cutaway front view of FIG. 31 when locked.
Figure 36:
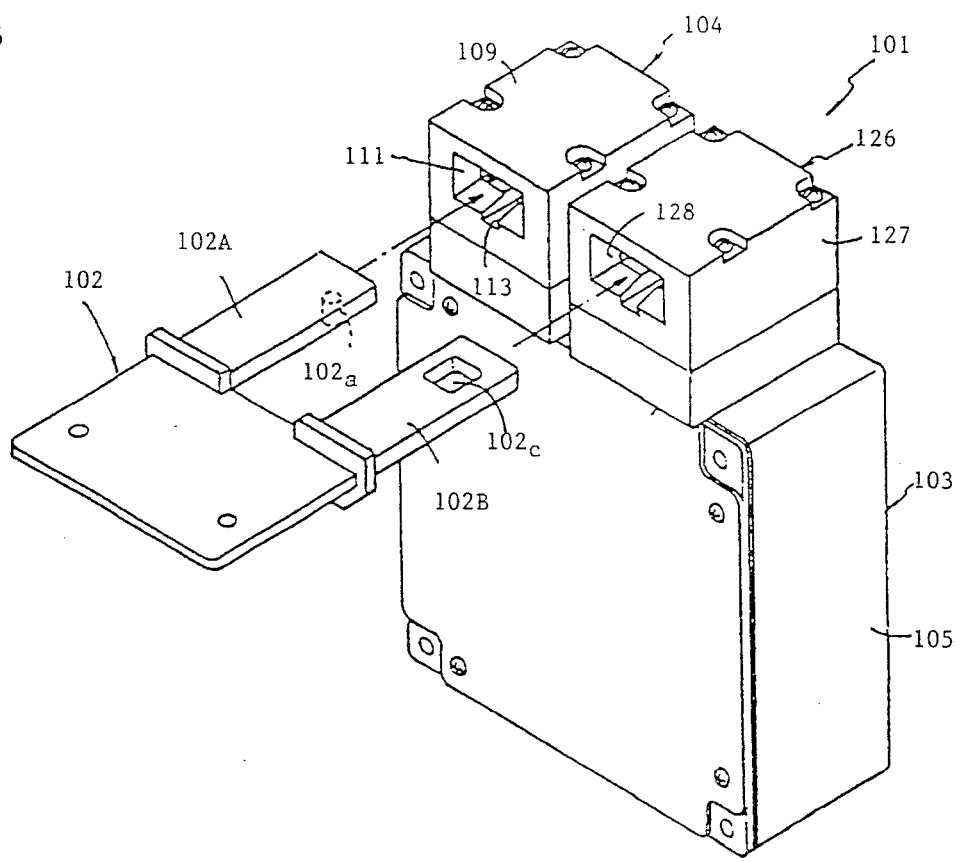
FIG. 36 is a perspective view of a key switch similar to the second embodiment switch.
Figure 37:
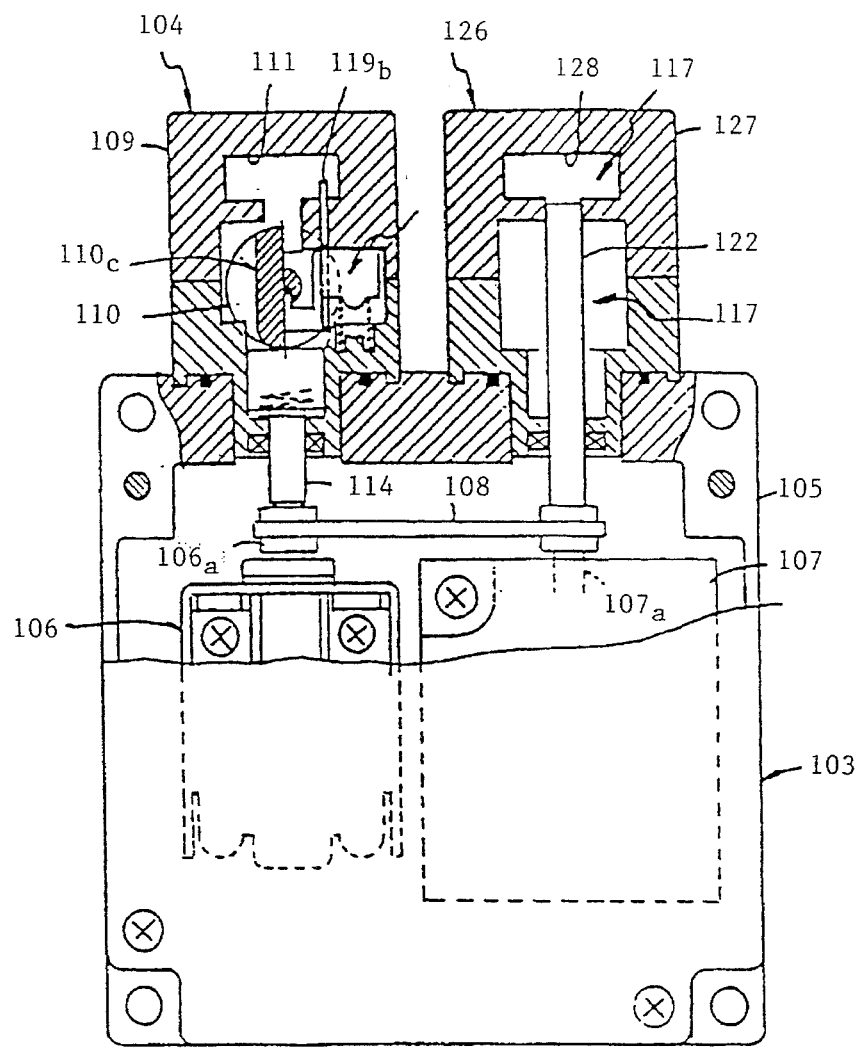
FIG. 37 is a cutaway front view of FIG. 36 with the key removed.
Figure 38:
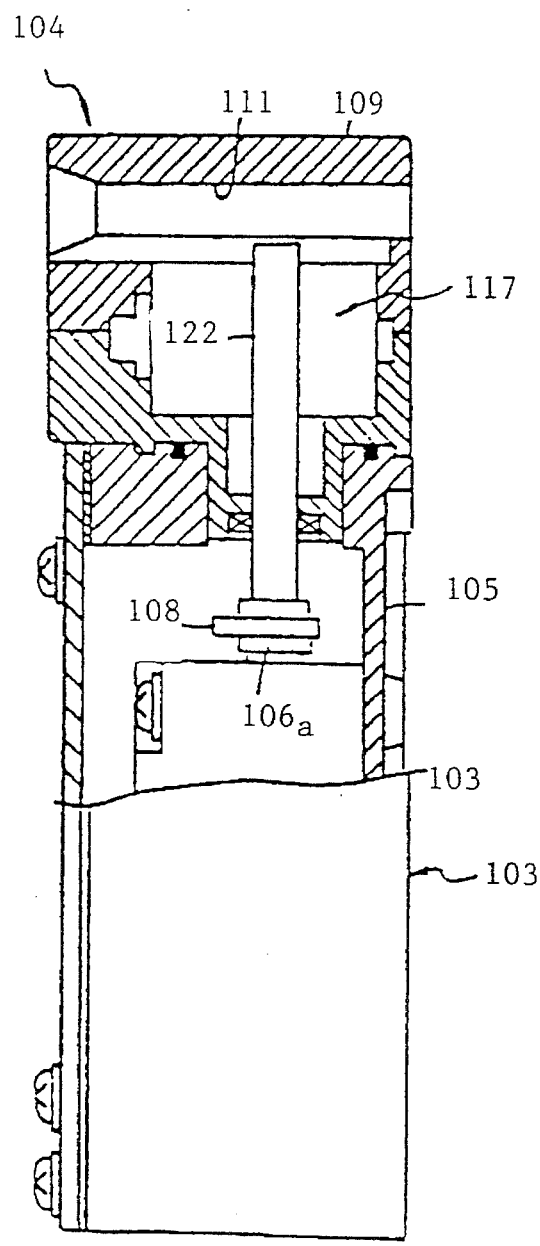
FIG. 38 is a cutaway side view of FIG. 36 with the key removed.
Figure 39:
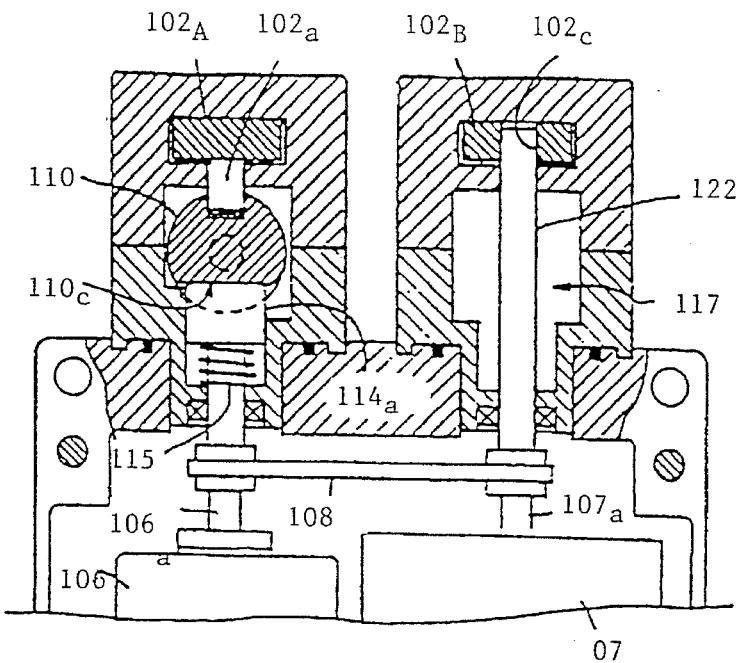
FIG. 39 is a cutaway front view of FIG. 36 with the key inserted.
Figure 40:
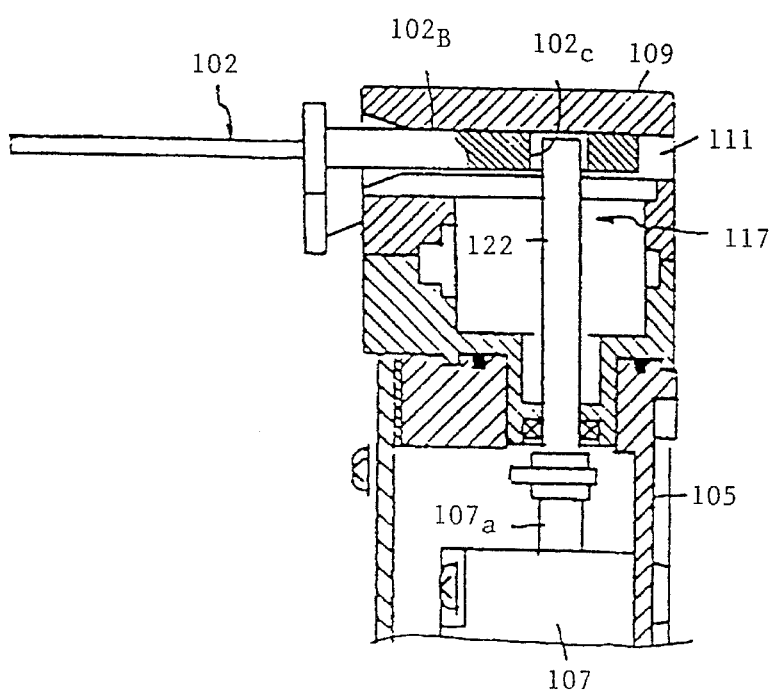
FIG. 40 is a cutaway side view of FIG. 36 with the key inserted.

In another modification of the above-described second embodiment switch, a lock arm 150 shown in FIGS. 31 and 32 is attached to actuator shaft 107a, which projects upward from electromagnetic solenoid 107, which is of a rotary type. When shaft 107a rotates, plunger 114 and actuator 106a come in contact with the lower segment 150c of the lock arm, as shown in FIGS. 32 and 33. When it rotates the other way, plunger 114 and actuator 106a come in contact with the upper segment 150a of the lock arm as shown in FIG. 34 and FIG. 35. This fulfills the same function as in the modified second embodiment mentioned above.

FIGS. 36 through 40 illustrate a still further modified second embodiment switch. In this modified embodiment, the aforesaid locking mechanism 117 has a different configuration. A second head unit, 126, is attached to the top of switch housing 101 for the key lock. Head housing 127, which serves as the exterior shell of head unit 126, also has a keyhole 128. Key 102 has two stems. Stem 102A, which actuates the switch, goes into keyhole 111 in head unit 104, and stem 102B, which locks the key, goes into the hole in head unit 126.

Lock shaft 122 protrudes upward from actuator shaft 107a on solenoid 107. Shaft 107a is connected to actuator 106a of switching element 106 via coupling arm 108. Lock shaft 122 extends as far as the lower edge of keyhole 128 in the aforesaid head unit 126.

When key 102 is inserted in head units 104 and 126, switching element 106 is switched on as was described previously. Actuator shaft 107a is forced upward, causing lock shaft 122 to enter keyhole 128. The lock shaft goes through hole 102c in stem 102B, locking key 102 in the hole.

When current flows into electromagnetic solenoid 107, actuator shaft 107a is drawn downward and the switching element is switched off. Thus the key lock is released just as in the preceding example.

The present invention has been described in reference to the specific embodiments presented herein. Variation and modification within the spirit and scope of this invention, however, will become apparent to those of ordinary skill upon reading this disclosure. The appended claims are therefore not limited in scope to the above described embodiments.

What is claimed is:

1. A key switch, comprising:

a switching element to control an electric status of an external device;

a first actuator having a changeable position to actuate said switching element;

a rotating element, with a guide to control its rotation, which changes the position of said first actuator;

a first locking mechanism having means to immobilize said rotating element;

a key;

a means, responsive to said key, for disengaging said first locking mechanism and rotating said rotating element;

an electromagnetic solenoid activated in response to an external signal;

a second locking mechanism mechanically connected with said electromagnetic solenoid having means to prevent said key from being removed;

a second actuator for said switching element which is mechanically connected with said electromagnetic solenoid; and a housing to enclose said switching element, said first actuator, said rotating element, said first locking mechanism, said electromagnetic solenoid, said second locking mechanism, and said second actuator, with an opening into which said key can go.

2. A key switch as in claim 1, wherein said switching element and said electromagnetic solenoid are positioned in parallel.

3. A key switch as in claim 1, wherein said key has a pin arranged thereon, and wherein said guide to control said rotation is formed on said rotation element and is shaped as a groove in which said pin on said key can be engaged.

4. A key switch as in claim 1, further comprising a hermetic seal to isolate the interior of said opening from the exterior when said key is in said opening.

5. A key switch as in claim 1, wherein said second actuator comprises a reciprocating arm having a movement corresponding to an action of said electromagnetic solenoid.

6. A key switch as in claim 1, wherein said switching element is activated only when said first locking mechanism and said second locking mechanism are released.

* * * * *